US012287959B2

(12) United States Patent
Turner et al.

(10) Patent No.: US 12,287,959 B2
(45) Date of Patent: Apr. 29, 2025

(54) PROVIDING A RECOMMENDATION FOR SELECTION OF A USER INTERFACE ELEMENT OF A USER INTERFACE

(71) Applicant: Google LLC, Mountain View, CA (US)

(72) Inventors: Joseph L. Turner, San Mateo, CA (US); Stephen Rhys Norum, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/247,333

(22) PCT Filed: Jun. 14, 2022

(86) PCT No.: PCT/US2022/033330
§ 371 (c)(1),
(2) Date: Mar. 30, 2023

(87) PCT Pub. No.: WO2023/244212
PCT Pub. Date: Dec. 21, 2023

(65) Prior Publication Data
US 2024/0370144 A1 Nov. 7, 2024

(51) Int. Cl.
G06F 3/048 (2013.01)
G06F 3/0482 (2013.01)
G06F 3/04842 (2022.01)
(52) U.S. Cl.
CPC ........ G06F 3/04842 (2013.01); G06F 3/0482 (2013.01)

(58) Field of Classification Search
None
See application file for complete search history.

(56) References Cited

U.S. PATENT DOCUMENTS 9,658,739 B1 * 5/2017 Freund ................ G06F 3/04817
2008/0134045 A1 6/2008 Fridman et al.
2012/0179964 A1 * 7/2012 Yun ......................... G06F 9/453
715/705

(Continued)

OTHER PUBLICATIONS

Hartmann, "Context-Aware Intelligent User Interfaces for Supporting System Use", Dissertations of Technical University of Darmstadt, Jan. 18, 2010, http://tuprints.ulb.tu-darmstadt.de/2165/1/PHD.PDF, retrieved Jun. 20, 2016, pp. 1-201, XP055281756.

(Continued)

Primary Examiner — Thanh T Vu
(74) Attorney, Agent, or Firm — DORITY & MANNING P.A.

(57) ABSTRACT

A user interface including a plurality of user interface elements is provided to a display of a user computing device. In response to the user computing device not receiving a selection of one of the plurality of user interface elements after a predetermined period of time, the user computing device provides a recommendation indicating a first user interface element of the plurality of user interface elements for selection. The recommendation is generated after the predetermined period of time and is based on one or more previous interactions with one or more of the plurality of user interface elements by one or more users of respective user computing devices.

20 Claims, 9 Drawing Sheets

(56) References Cited

U.S. PATENT DOCUMENTS

| | | | |
|---|---|---|---|
| 2013/0253833 A1* | 9/2013 | Tuukkanen | G06F 3/0481 |
| | | | 701/538 |
| 2014/0108978 A1* | 4/2014 | Yu | G06F 3/0482 |
| | | | 715/765 |
| 2014/0188766 A1* | 7/2014 | Waldman | G06F 16/904 |
| | | | 707/723 |
| 2016/0098493 A1* | 4/2016 | Primke | G06F 16/9536 |
| | | | 707/754 |
| 2016/0350304 A1 | 12/2016 | Aggarwal et al. | |
| 2019/0042059 A1* | 2/2019 | Baer | G06F 3/0481 |
| 2019/0289367 A1* | 9/2019 | Siddiq | H04N 21/485 |
| 2020/0304863 A1* | 9/2020 | Domm | H04L 67/125 |
| 2023/0205833 A1* | 6/2023 | Saha | G06F 16/9536 |
| | | | 715/711 |

OTHER PUBLICATIONS

International Search Report for Application No. PCT/US2022/033330, mailed on Feb. 10, 2023, 6 pages.

International Preliminary Report on Patentability for Application No. PCT/US2022/033330, mailed Dec. 26, 2024, 10 pages.

* cited by examiner

PROVIDING A RECOMMENDATION FOR SELECTION OF A USER INTERFACE ELEMENT OF A USER INTERFACE

PRIORITY CLAIM

This application is based upon and claims the right of priority under 35 U.S.C. § 371 to International Application No. PCT/US2022/033330 filed on Jun. 14, 2022, which is incorporated by reference herein in its entirety.

FIELD

The disclosure relates generally to providing a recommendation to a user for a selection of a user interface element of a plurality of user interface elements provided on a user interface, based on interactions with one or more of the user interface elements by other users. More particularly, the disclosure relates to providing a suggestion to the user to select a particular user interface element displayed on the user interface after a user computing device does not receive an input selecting one of the user interface elements displayed on the user interface after a certain amount of time.

BACKGROUND

When users navigate through different user interfaces provided by an application or by a website, in some instances the user may be unfamiliar with a next action to take. For example, the user may be utilizing the application for a first time or may be visiting the website for a first time and may be uncertain as to which user interface element (e.g., a button) to interact with or select (e.g., by tapping or clicking on the button).

SUMMARY

Aspects and advantages of embodiments of the disclosure will be set forth in part in the following description, or can be learned from the description, or can be learned through practice of the example embodiments.

In one or more example embodiments, a user computing device includes a display, one or more memories configured to store instructions, and one or more processors configured to execute the instructions stored in the one or memories to perform operations, the operations including: providing the display with a user interface including a plurality of user interface elements, and in response to the user computing device not receiving a selection of one of the plurality of user interface elements after a predetermined period of time, providing a recommendation to a user of the user computing device indicating a first user interface element of the plurality of user interface elements is recommended for selection, wherein the recommendation is generated after the predetermined period of time and is based on one or more previous interactions with one or more of the plurality of user interface elements by one or more users of respective user computing devices.

In some implementations, the one or more processors are configured to provide the recommendation to the user of the user computing device by providing the user interface with a recommendation user interface element which provides the recommendation to the user of the user computing device to select the first user interface element of the plurality of user interface elements.

In some implementations, the recommendation user interface element is disposed adjacent to the first user interface element and includes at least one of a text summary or an image indicating to select the first user interface element In some implementations, the user computing device further includes an output device and the recommendation is provided to the user via at least one of audio output or haptic feedback.

In some implementations, the one or more processors are configured to provide the recommendation to the user of the user computing device by changing one or more features of the first user interface element.

In some implementations, the one or more processors are configured to change the one or more features of the first user interface element by at least one of highlighting the first user interface element, changing a size of the first user interface element, or changing a color of the first user interface element.

In some implementations, the one or more processors are configured to execute the instructions stored in the one or memories to: in response to the user computing device not receiving the selection of one of the user interface elements after the predetermined period of time, transmit, to a server computing system, a request for a recommendation of a user interface element of the plurality of user interface elements for selection, and to receive, from the server computing system, information indicating the first user interface element of the plurality of user interface elements is recommended for selection.

In some implementations, the information indicating the first user interface element of the plurality of user interface elements is recommended for selection includes: the user interface further including a recommendation user interface element generated by the server computing system, or information for the one or more processors to generate the user interface including the recommendation user interface element, wherein the recommendation user interface element provides the recommendation to the user of the user computing device indicating the first user interface element of the plurality of user interface elements is recommended for selection.

In one or more example embodiments, a server computing system includes one or more memories configured to store instructions and one or more processors configured to execute the instructions stored in the one or memories to perform operations, the operations including: providing, for display on a display of a user computing device, a user interface including a plurality of user interface elements, in response to an indication that the user computing device has not received a selection of one of the plurality of user interface elements after a predetermined period of time, determining a first user interface element of the plurality of user interface elements to recommend for selection by a user of the user computing device, based on one or more previous interactions with one or more of the plurality of user interface elements by one or more users of respective user computing devices, and providing information to the user computing device indicating a recommendation to the user of the user computing device to select the first user interface element of the plurality of user interface elements.

In some implementations, the information indicating the recommendation to the user of the user computing device includes a recommendation user interface element for display on the user interface which provides the recommendation to the user of the user computing device to select the first user interface element of the plurality of user interface elements.

In some implementations, the information indicating the recommendation to the user of the user computing device includes information for the user computing device to produce an audio output providing the recommendation to the user of the user computing device to select the first user interface element of the plurality of user interface elements.

In some implementations, the information indicating the recommendation to the user of the user computing device includes information to change one or more features of the first user interface element to provide the recommendation to the user of the user computing device to select the first user interface element of the plurality of user interface elements.

In some implementations, the information to change one or more features of the first user interface element includes at least one of: information to highlight the first user interface element, information to change a size of the first user interface element, or information to change a color of the first user interface element.

In some implementations, the indication that the user computing device has not received the selection of one of the plurality of user interface elements after the predetermined period of time includes the one or more processors receiving a request for a recommendation of a user interface element of the plurality of user interface elements for selection by the user of the user computing device, and the one or more processors are configured to, in response to receiving the request, determine the first user interface element of the plurality of user interface elements to recommend for selection by the user of the user computing device.

In some implementations, the indication that the user computing device has not received the selection of one of the plurality of user interface elements after the predetermined period of time includes log activity of the user computing device indicating the user computing device has not received the selection of one of the plurality of user interface elements for the predetermined period of time.

In some implementations, the one or more processors are configured to determine a user interface element among the plurality of user interface elements which is most frequently selected by the one or more users other than the user of the user computing device, as the first user interface element.

In some implementations, the one or more processors are configured to determine the first user interface element based on a sequence of one or more inputs to the user computing device before the user interface including the plurality of user interface elements is provided for display on the display of the user computing device.

In some implementations, the one or more processors are configured to the determine the first user interface element based on a user interface element among the plurality of user interface elements which is most frequently selected by one or more users other than the user of the user computing device after a same sequence of the one or more inputs to respective user computing devices of the one or more users other than the user of the user computing device, before the user interface including the plurality of user interface elements is provided for display on respective displays of the respective user computing devices.

In some implementations, the one or more processors are configured to determine the first user interface element based on contextual information including at least one of a time of day, weather information at a location associated with the user computing device, traffic information associated with the user computing device, user profile information of the user of the user computing device, or user profile information of one or more users other than the user of the user computing device.

In one or more example embodiments, a computer implemented method for a server computing system includes providing, for display on a display of a user computing device, a user interface including a plurality of user interface elements, determining the user computing device has not received a selection of one of the plurality of user interface elements after a predetermined period of time, in response to determining the user computing device has not received the selection of the one of the plurality of user interface elements after the predetermined period of time, determining a first user interface element of the plurality of user interface elements to recommend for selection by a user of the user computing device, based on one or more previous interactions with one or more of the plurality of user interface elements by one or more users of respective user computing devices, and providing information to the user computing device indicating a recommendation to the user of the user computing device to select the first user interface element.

In one or more example embodiments, a computer implemented method for a user computing device includes providing a display of a user computing device with a user interface including a plurality of user interface elements, and in response to not receiving a selection of one of the plurality of user interface elements after a predetermined period of time, providing a recommendation to a user of the user computing device indicating a first user interface element of the plurality of user interface elements is recommended for selection, the recommendation being generated after the predetermined period of time and being based on one or more previous interactions with one or more of the plurality of user interface elements by one or more users of respective user computing devices.

In one or more example embodiments, a computer-readable medium (e.g., a non-transitory computer-readable medium) which stores instructions that are executable by one or more processors of a user computing device and/or a server system is provided. In some implementations the computer-readable medium stores instructions which may include instructions to cause the one or more processors to perform one or more operations of any of the methods described herein (e.g., operations of the server computing system and/or operations of the user computing device). The computer-readable medium may store additional instructions to execute other aspects of the server computing system and user computing device and corresponding methods of operation, as described herein.

These and other features, aspects, and advantages of various embodiments of the disclosure will become better understood with reference to the following description, drawings, and appended claims. The accompanying drawings, which are incorporated in and constitute a part of this specification, illustrate example embodiments of the disclosure and, together with the description, serve to explain the related principles.

BRIEF DESCRIPTION OF THE DRAWINGS

Detailed discussion of example embodiments directed to one of ordinary skill in the art is set forth in the specification, which makes reference to the appended drawings, in which.

DETAILED DESCRIPTION

Figure 1:
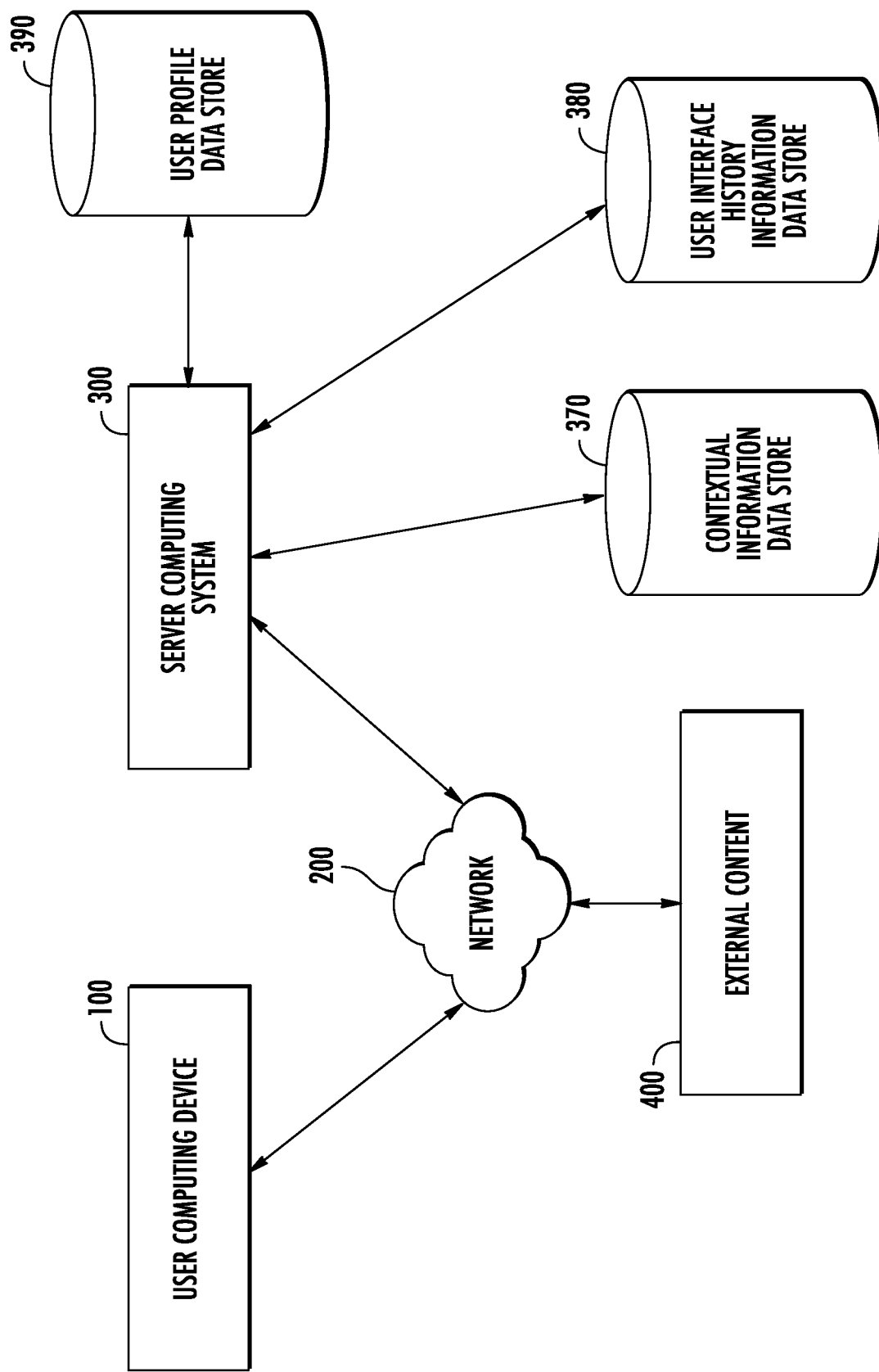
FIG. 1 depicts an example system according to one or more example embodiments of the disclosure.

Reference now will be made to embodiments of the disclosure, one or more examples of which are illustrated in the drawings, wherein like reference characters denote like elements. Each example is provided by way of explanation of the disclosure and is not intended to limit the disclosure. In fact, it will be apparent to those skilled in the art that various modifications and variations can be made to disclosure without departing from the scope or spirit of the disclosure. For instance, features illustrated or described as part of one embodiment can be used with another embodiment to yield a still further embodiment. Thus, it is intended that the disclosure covers such modifications and variations as come within the scope of the appended claims and their equivalents.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

It will be understood that when an element is referred to as being "connected" to another element, the expression encompasses an example of a direct connection or direct coupling, as well as a connection or coupling with one or more other elements interposed therebetween.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A. (2) at least one of B, and (3) at least one of A and at least one of B. Likewise, the scope of the expression or phrase "at least one of A, B, or C" is intended to include all of the following: (1) at least one of A. (2) at least one of B. (3) at least one of C. (4) at least one of A and at least one of B. (5) at least one of A and at least one of C. (6) at least one of B and at least one of C, and (7) at least one of A, at least one of B, and at least one of C.

According to example embodiments, when a user navigates to a user interface (e.g., provided by an application or website) and the user computing device does not receive an input selecting one of the user interface elements provided on the user interface, the user computing device provides a recommendation to the user for selecting one of the user interface elements, for example based on what most other users do next in a same or similar circumstance and/or based on previous interactions of the user with user interface elements of the user interface. For example, if the user opens an application and doesn't make a selection (e.g., does not select a user interface element by clicking on a button), a recommendation is provided to the user (e.g., recommending a most tapped button such as a search box) after a certain amount (e.g. predetermined period) of time (e.g., 5 seconds). The predetermined period of time could in various examples be more than, or less than, 5 seconds. The predetermined amount of time may be selected (e.g., by the user, or based on determined user characteristics) to ensure that the predetermined period of time prevents the recommendation from interfering with normal use of the user interface by the user. For example, the recommendation may be provided to the user using a recommendation user interface element to indicate to the user which user interface element to select. For example, the recommendation may be provided by other methods, such as by an audio output through a speaker, by haptic feedback (e.g., providing haptic feedback when the user computing device detects a cursor or finger hovering over the recommended user interface element or when a user gazes at the recommended user interface element) by changing a feature of the user interface element that is being suggested (e.g., by highlighting the user interface element, changing a color of the user interface element, changing a size of the user interface element, etc.), by activating one or more light sources, and the like. In some implementations, a combination of the above methods may be used to suggest the user interface element for selection (e.g., by using a recommendation user interface element, changing one or more features of the user interface element that is being suggested, and providing an audio output).

In some implementations, when a user provides a sequence of inputs (e.g., a tap to a search box and then a selection of a suggested search query), then pauses for a certain amount of time without making a next input to the current user interface, a recommendation can be provided to the user for selecting one of the user interface elements based on what most users do after performing one or more of the same sequence of inputs leading to the current user interface (e.g., the same last two inputs, the same previous input, etc.).

In some implementations, the recommendation as to which user interface element is to be suggested for selection by the user is generated dynamically. For example, a server computing system may generate (e.g., automatically generate) a recommendation for selecting a user interface element after the user computing device does not receive an input selecting one of the user interface elements provided on the user interface in a certain amount of time. For example, the user computing device may request from the server computing system a recommended user interface element after not receiving an input from the user in the certain amount of time. As another example, the server computing system may automatically generate the recommended user interface element in response to the user computing device not reporting an interaction with a user interface element on the user interface (i.e., a client-server log lacking information regarding receiving an input selecting one of the user interface elements on the user interface). This may help to reduce network traffic, by automatically directing the user to an appropriate user interface element, as opposed to servicing unfocussed requests from users who may be unfamiliar with the user interface. The efficiency and robustness of the interaction between the user and the user interface may similarly be improved, because the user may be automatically directed to the appropriate user interface element when it is determined that the user is hesitating on making a selection by virtue of the delay in making a selection.

To generate or determine the user interface element to recommend for selection by the user, the server computing system may be configured to reference a stack of the most recently interacted with user interface elements for a user interface (e.g., within a certain duration of time such as the last day, the last week, the last month, etc.). For example, the server computing system may be configured to determine which of the most recently interacted with user interface elements for the user interface have been selected the most frequently. For example, the server computing system may be configured to select the user interface element which has been selected the most frequently (e.g., within the certain duration of time) as a user interface element to be recommended or suggested for selection by the user.

For example, the server computing system may be configured to provide information to the user computing device indicating the recommendation as to which user interface element is to be suggested for selection by the user. In some implementations, the information associated with the recommendation may include instructions to provide an output (e.g., an audio output, haptic feedback, etc.) which suggests the user interface element for selection by the user. In some implementations, the server computing system may generate a user interface to be provided for display on a display of the user computing device where the user interface includes a recommendation user interface element which suggests the user interface element for selection by the user. The information may include location information as to where the recommendation user interface element should be placed on the user interface. The recommendation user interface element may include text information that includes a text summary related to the suggested user interface element and/or an image related to the suggested user interface element. In some implementations, the server computing system may generate a user interface to be provided for display on a display of the user computing device where one or more features of the user interface element which the server computing system has determined is to be suggested for selection by the user has been modified (e.g., by highlighting the user interface element, changing a color of the user interface element, changing a size of the user interface element, etc.).

In some implementations, the user may be using the application for the first time or may be visiting the website for a first time. Therefore, in some implementations the stack does not include a history of prior interactions with user interface elements for the user interface related to the user, and instead the stack includes a history of prior interactions with user interface elements for the user interface related to users other than the user. In some implementations, the user may have used the application previously or may have visited the website previously. The server computing system may be configured to consider the user's previous interactions with the user interface in generating a recommendation for a user interface element to be selected by the user. For example, the server computing system may be configured to suggest a user interface element which the user has not previously selected and/or the server computing system may be configured to assign a greater weight to user interface elements which the user has not previously selected in determining which user interface element to suggest for selection by the user. For example, in some implementations if the user previously selected a user interface element from the user interface a long time ago (i.e., greater than a predetermined period of time such as six months, one year, etc.), the server computing system may be configured to assign a greater weight to the user interface element which the user previously selected in determining which user interface element to recommend, with an inference being that the user may forgotten their previous selection. For example, in some implementations if the user selected a user interface element from a different but analogous user interface (e.g., from a different application, from a website that corresponds to an application currently being executed, from an application that corresponds to a website currently being browsed, etc.), the server computing system may be configured to assign a greater weight to the user interface element which the user selected from the analogous user interface in determining which user interface element to recommend, with an inference being that the user likely would make a similar selection.

In some implementations, data corresponding to user interactions with the user interface after a recommendation is provided can be used to analyze the effectiveness of the user interface. For example, it may be inferred that a user interface is confusing or ineffective if users frequently select recommended user interface elements after being provided a recommendation. Therefore, data corresponding to user interactions with the user interface after a recommendation is provided may be collected by a server computing system and used as a feedback loop to subsequently improve the user interface. For example, the server computing system may be configured to change at least one feature (e.g., a size, a location, a color, etc.) of at least one user interface element of the user interface in response to analyzing the collected data corresponding to the user interactions with the user interface after the recommendation is provided (e.g., in response to the collected data indicating users frequently select the recommended user interface element). For example, where a recommendation pertaining to a first user interface element is regularly or frequently selected, for example selected more than a predetermined threshold number of times or selected more than a predetermined threshold number of times within a predetermined time window, it may be determined that the display of the first user interface element is not sufficiently prominent in the user interface, for example it may be determined that at least one feature (e.g., a size, a location, a color, etc.) associated with the first user interface element in the user interface needs to be adjusted. Accordingly, the prominence of the first user interface element may be increased, for example by adjusting at least one feature (e.g., a size, a location, a color, etc.) of the first user interface element in the user interface. This continual feedback loop may iteratively improve the efficiency of the interaction between the user and the user interface. This may in turn help to progressively reduce overall system latency, and reduce network traffic and processing burden, by progressively reducing the need for system intervention (e.g., reducing the need for recommendations).

According to example embodiments disclosed herein, a user interface element recommender is configured to provide or generate a recommendation for a user interface element to be selected by a user based on an output or prediction generated by using a machine learning resource. For example, a first user interface element among a plurality of user interface elements provided for the user interface may be identified by the machine learning resource as a user interface element to be suggested to a user when the machine learning resource determines or predicts the first user interface element is likely to be of interest or assistance to the user (e.g., having a confidence value greater than a threshold value, a probability of being of interest or assistance to the user greater than a threshold value, being determined as most likely to be of interest or assistance to the user based on interactions with the user interface by other users, and the like). For example, the machine learning resource may select a candidate user interface element as a user interface element for which the user interface element recommender should suggest as the first user interface element for selection by the user, based on one or more of: (1) contextual factors such as time of day, weather, a category or genre of content associated with the user interface that is currently displayed, a type of device being used to access or view the user interface, and the like, (2) interactions with the user interface by previous users, (3) historical actions with respect to an application/website by the user prior to reaching the current user interface, such as a sequence of inputs (e.g., taps) made by the user leading to the current user interface, (4) user profile data which indicates similarities (e.g., demographic similarities) between the user and other users who have interacted with the user interface, and the like. For example, the machine learning resource may assign a higher weight to a user interface element that has been selected (e.g., tapped) more frequently compared to weights assigned to other user interface elements selected less frequently. For example, the machine learning resource may assign a higher weight to more recent selections of a user interface element provided on a user interface compared to weights assigned to other user interface elements selected less recently. For example, the machine learning resource may assign a higher weight to user interface elements that are selected by other users who are more similar to the user (e.g., similar age, similar education, etc.) compared to weights assigned to other user interface elements that are selected by other users who are less similar to the user. For example, the machine learning resource may suggest a user interface element for selection by the user which has been most frequently selected after a similar or same sequence of inputs (e.g., taps) made by the user leading to the current user interface.

For example, the machine learning resource may be updated or adjusted based on an evaluation of user interactions with the user interface. For example, if users generally do not interact with the suggested user interface element (e.g., the first user interface element), there may be an implication that the first user interface element is not of interest or assistance to the user with respect to the content of the user interface. Accordingly, the machine learning resource may be adjusted to reflect the user interactions (or lack thereof) with the user interface. Likewise, if users generally do interact with the suggested user interface element (e.g., the first user interface element), there may be an implication that the first user interface element is of interest or assistance to the user with respect to the content of the user interface. Accordingly, the machine learning resource may be adjusted to reflect the user interactions with the user interface.

The systems and methods of the disclosure provide a number of technical effects and benefits. In one example, the disclosure provides a way for users to easily understand or learn more about how to access features of an application or website because the users are provided with a suggestion to select a particular user interface element, e.g., after a predetermined amount of time when it can be inferred that the user is unsure of which action to take next after reaching a particular user interface. By providing a recommendation user interface element to suggest a particular user interface element for selection, the user is able to easily and quickly navigate through the application or website, reducing confusion on the part of the user and reducing costs to the network which could be incurred by the user selecting incorrect user interface elements. For example, network traffic could be reduced and user and server system computing resources could be efficiently utilized by directing the user to navigate through an application or website in a manner which is helpful. In such fashion, the user is able to avoid selecting an incorrect user interface element which causes a user interface to be provided that may not be of interest or assistance to the user, which is computationally expensive and causes delays to the user. The recommendation user interface element as disclosed herein provides a suggestion to a user to select a user interface element that has a relatively high probability of being of interest or assistance to the user, thereby conserving time, processing, memory, and network resources of the computing system (whether server device, client device, or both). Likewise, user convenience and experience is improved because the user is not discouraged by the complexity of the content of the user interface and the user will be more likely to continue interacting with the application or website. User convenience and experience is also improved because the user avoids the inconvenience of loading incorrect user interfaces because the user is unsure of which user interface element to select, and instead the user is provided with assistance to navigate through an application or website by being provided with the recommendation user interface element which provides a suggestion to a user to select a user interface element that has a relatively high probability of being of interest or assistance to the user.

In some cases, systems of the type disclosed herein may learn through one or more various machine learning techniques (e.g., by training a neural network or other machine-learned model) a balance of the types of content items, perspectives, sources, and/or other attributes that are preferred, such as based on different types of content, different user populations, different contexts such as timing and location, etc. For example, data descriptive of actions taken by one or more users (e.g., "clicks," "taps," "likes," or similar) with respect to the user interface in various contextual scenarios can be stored and used as training data to train (e.g., via supervised training techniques) one or more machine-learned models to, after training, generate predictions which assist in providing content (e.g., user interface elements) in the user interface which meets the one or more users' respective preferences or intent. In such a way, system performance is improved with reduced manual intervention, providing fewer erroneous or unintended user interactions and further conserving processing, memory, and network resources of the computing system (whether server device, client device, or both).

Referring now to the drawings, FIG. 1 is an example system according to one or more example embodiments of the disclosure. FIG. 1 illustrates an example of a system which includes a user computing device 100, a server computing system 300, contextual information data store 370, user interface history information data store 380, user profile data store 390, and external content 400, each of which may be in communication with one another over a network 200.

For example, the user computing device 100 can include any of a personal computer, a smartphone, a laptop, a tablet computer, and the like.

For example, the network 200 may include any type of communications network such as a local area network (LAN), wireless local area network (WLAN), wide area network (WAN), personal area network (PAN), virtual private network (VPN), or the like. For example, wireless communication between elements of the example embodiments may be performed via a wireless LAN, Wi-Fi, Bluetooth, ZigBee, Wi-Fi direct (WFD), ultra wideband (UWB), infrared data association (IrDA), Bluetooth low energy (BLE), near field communication (NFC), a radio frequency (RF) signal, and the like. For example, wired communication between elements of the example embodiments may be performed via a pair cable, a coaxial cable, an optical fiber cable, an Ethernet cable, and the like.

For example, the server computing system 300 can include a server, or a combination of servers (e.g., a web server, application server, etc.) in communication with one another, for example in a distributed fashion.

In example embodiments, the server computing system 300 may obtain data or information from one or more of the contextual information data store 370, user interface history information data store 380, user profile data store 390, and external content 400. The contextual information data store 370, user interface history information data store 380, user profile data store 390 may be integrally provided with the server computing system 300 (e.g., as part of the memory 320 of the server computing system 300) or may be separately (e.g., remotely) provided. Further, contextual information data store 370, user interface history information data store 380, user profile data store 390 can be combined as a single data store (database) or may be a plurality of respective data stores. Data stored in one data store (e.g., the user interface history information data store 380) may overlap with some data stored in another data store (e.g., the user profile data store 390). In some implementations, one data store (e.g., the user profile data store 390) may reference data that is stored in another data store (e.g., the user interface history information data store 380).

Contextual information data store 370 can store context information associated with the user of the user computing device 100 and/or context information associated with other users who have previously interacted with the user interface. For example, the context information may include contextual factors such as time of day, weather, a category or genre of content associated with the user interface that is currently displayed, a type of device being used to access or view the user interface, traffic information, and the like. For example, the context information may relate to a context of previous users at a time that the previous users selected one of the user interface elements presented on the user interface.

User interface history information data store 380 can store information about previous users' interactions with the user interface. For example, user interface history information data store 380 can include a record of selections of user interface elements of the user interface. For example, user interface history information data store 380 can include time information associated with the record of selections of user interface elements of the user interface. For example, the selections of user interface elements of the user interface may be associated with a first time that each user was provided with the user interface. The user interface history information may be used to determine a most often selected user interface element of the plurality of user interface elements. The user interface history information may be used to determine the most recently selected user interface elements of the plurality of user interface elements. The user interface history information may also include the selections of user interface elements of the user interface of the user of the user computing device 100, if it is not the first time that the user has been provided with the user interface.

User interface history information data store 380 can also store information regarding previous inputs received by user computing devices prior to users' being provided with the user interface. For example, the user interface history information data store 380 can include a record of inputs received by user computing devices before the user interface is provided to each respective user. For example, the user interface history information data store 380 can include time information associated with the record of inputs before reaching the user interface. For example, the record of inputs may be associated with a first time that each user was provided with the user interface. The user interface history information data store 380 may be used to determine a user interface element of the plurality of user interface elements to recommend for selection by the user of the user computing device 100. For example, previous inputs the user computing device 100 received from the user to reach the user interface may be stored in the user interface history information data store 380. As an example, the user interface history information data store 380 may store data associated with the user computing device 100 receiving three inputs (e.g., input A, input B, and input C) from the user to reach the user interface. As an example, the user interface history information data store 380 may store data associated with user computing devices receiving various inputs from other users before the user interface is provided to the respective user computing devices. One or more of the sequence of inputs that were received by the user computing devices from other users may be compared with one or more of the sequence of inputs that were received from the user of the user computing device 100 before the user interface was provided, in determining a user interface element to recommend for selection.

User profile data store 390 can store information regarding one or more user profiles, including a variety of user data such as user preference data, user demographic data, user calendar data, user social network data, user historical travel data, and the like. For example, the user profile data store 390 can include, but is not limited to, email data including textual content, images, email-associated calendar information, or contact information; social media data including comments, reviews, check-ins, likes, invitations, contacts, or reservations; calendar application data including dates, times, events, description, or other content; virtual wallet data including purchases, electronic tickets, coupons, or deals; scheduling data; location data; SMS data; or other suitable data associated with a user account. According to one or more examples of the disclosure, such data can be analyzed to determine or predict potential preferences of the user with respect to user interface elements presented on a user interface in determining one of the user interface elements to recommend for selection by the user. For example, user profile data of users who have previously interacted with a user interface can be compared with user profile data of a user who is provided with the user interface (e.g., for a first time), in determining one of the user interface elements to recommend for selection by the user.

The user profile data store 390 is provided to illustrate potential data that could be analyzed, in some embodiments, by the server computing system 300. However, such user data may not be collected, used, or analyzed unless the user has consented after being informed of what data is collected and how such data is used. Further, in some embodiments, the user can be provided with a tool (e.g., in the application 130, web browser 140, or via a user account) to revoke or modify the scope of permissions. In addition, certain information or data can be treated in one or more ways before it is stored or used, so that personally identifiable information is removed or stored in an encrypted fashion. Thus, particular user information stored in the user profile data store 390 may or may not be accessible to the server computing system 300 based on permissions given by the user, or such data may not be stored in the user profile data store 390 at all.

External content 400 can be any form of external content including news articles, webpages, video files, audio files, image files, written descriptions, ratings, game content, social media content, photographs, commercial offers, transportation methods, weather conditions, or other suitable external content. The user computing device 100 and server computing system 300 can access external content 400 over network 200. External content 400 can be searched by user computing device 100 and server computing system 300 according to known searching methods and search results can be ranked according to relevance, popularity, or other suitable attributes, including location-specific filtering or promotion.

With reference to FIG. 1, in an example embodiment a user of the user computing device 100 may navigate to a user interface of an application or of a web page provided via a web browser. The user interface may include a plurality of user interface elements and may be provided for display on a display of the user computing device 100 by the server computing system 300 via network 200. For example, the user may be unsure of which user interface element to select and not make a selection of one of the plurality of user interface elements for a certain amount of time (e.g., 5 seconds). In response to the non-selection of one of the plurality of user interface elements, the user computing device 100 may receive information from the server computing system 300 which indicates one of the user interface elements to recommend for selection by the user. FIGS. 4A through 6C, which will be discussed in more detail below, provide example user interfaces which illustrate some of the examples by which the user computing device 100 indicates one of the user interface elements to recommend for selection by the user, based on the information received from the server computing system 300. In some implementations, the server computing system 300 may store or retrieve the user interface including the user interface elements and provide the user interface in response to a request from the user computing device 100. In some implementations, the server computing system 300 may dynamically generate the information indicating one of the user interface elements to recommend for selection by the user, for example in response to the non-selection of one of the plurality of user interface elements.

Figure 2:
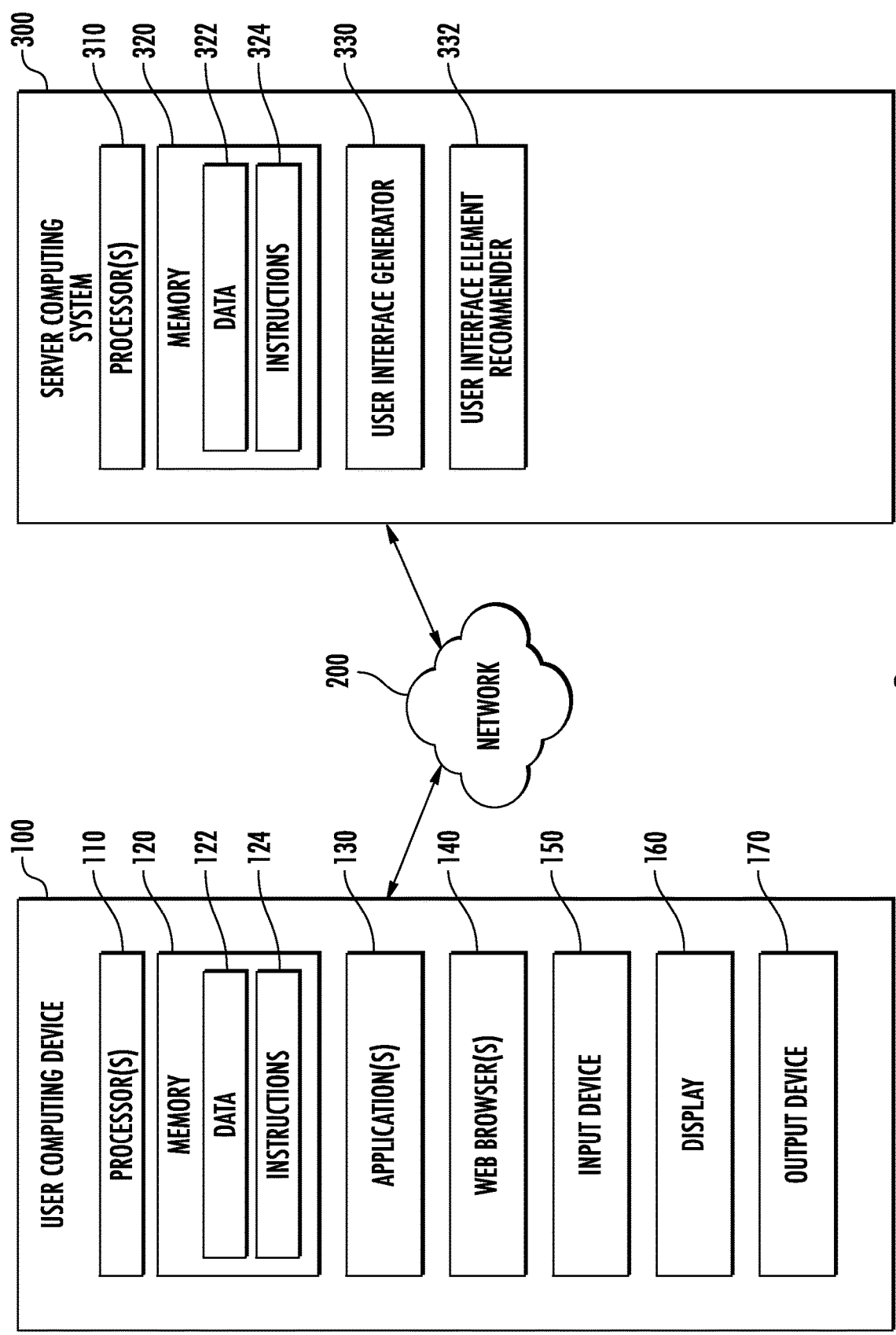
FIG. 2 depicts example block diagrams of a user computing device and server computing system according to one or more example embodiments of the disclosure.

Referring now to FIG. 2, example block diagrams of a user computing device and server computing system according to one or more example embodiments of the disclosure will now be described.

The user computing device 100 may include one or more processors 110, one or more memory devices 120, one or more applications 130, one or more web browsers 140, an input device 150, a display 160, and an output device 170. The server computing system 300 may include one or more processors 310, one or more memory devices 320, a user interface generator 330, and a user interface element recommender 332.

For example, the one or more processors 110, 310 can be any suitable processing device that can be included in a user computing device 100 or server computing system 300. For example, such a processor 110, 310 may include one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The one or more processors 110, 310 can be a single processor or a plurality of processors that are operatively connected, for example in parallel.

The memory 120, 320 can include one or more non-transitory computer-readable storage mediums, such as such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, and combinations thereof. However, examples of the memory 120, 320 are not limited to the above description, and the memory 120, 320 may be realized by other various devices and structures as would be understood by those skilled in the art.

For example, memory 120 can store instructions, that when executed, cause the one or more processors 110 to obtain information from the server computing system 300 regarding a recommendation for a user interface element among a plurality of user interface elements included in a user interface to be selected by a user of the user computing device 100. For example, memory 120 can store instructions, that when executed, cause the one or more processors 110 to provide the recommendation for the user interface element to be selected by the user of the user computing device 100. For example, memory 320 can store instructions, that when executed, cause the one or more processors 310 to provide a user interface including a plurality of user interface elements, to be displayed on a respective display of one or more user computing devices, as described according to examples of the disclosure. For example, memory 320 can store instructions, that when executed, cause the one or more processors 310 to provide information to the user computing device 100 regarding a recommendation for a user interface element among the plurality of user interface elements included in the user interface to be selected by a user of the user computing device 100, as described according to examples of the disclosure.

Memory 120 can also include data 122 and instructions 124 that can be retrieved, manipulated, created, or stored by the one or more processor(s) 110. In some example embodiments, such data can be accessed and used as input to obtain information from the server computing system 300 regarding a recommendation for a user interface element among a plurality of user interface elements included in a user interface to be selected by a user of the user computing device 100, as described according to examples of the disclosure. In some example embodiments, such data can be accessed and used as input to provide the recommendation for the user interface element to be selected by the user of the user computing device 100, as described according to examples of the disclosure. Memory 320 can also include data 322 and instructions 324 that can be retrieved, manipulated, created, or stored by the one or more processor(s) 310. In some example embodiments, such data can be accessed and used as input to provide information to the user computing device 100 regarding a recommendation for a user interface element among the plurality of user interface elements included in the user interface to be selected by a user of the user computing device 100, as described according to examples of the disclosure.

In FIG. 2, the user computing device 100 includes one or more applications 130. The one or more applications 130 can include any application which includes a user interface that a user navigates to various functions or features of the application. For example, the one or more applications 130 can include a navigation application, a media (e.g., video, audio, etc.) player application, a climate control application, a security application, a financial application, and the like. For example, a user may be unfamiliar with one or more user interfaces associated with an application and may be confused or need assistance selecting a correct user interface element included in a user interface. According to various examples of the disclosure, the user computing device 100 may receive information from the server computing system 300 regarding a recommendation for a user interface element among the plurality of user interface elements included in the user interface to be selected by the user of the user computing device 100. Therefore, the user is able to easily and quickly navigate through the application, reducing confusion on the part of the user and reducing costs to the network which could be incurred by the user selecting incorrect user interface elements.

In FIG. 2, the user computing device 100 includes one or more web browsers 140, which may also be referred to as an internet browser or simply as a browser. The one or more web browsers 140 may be any browser which are used to access a website or web page (e.g., via the world wide web). A user of the user computing device 100 may provide an input (e.g., a URL) to the web browser 140 to obtain content (e.g., content relating to navigation, media (e.g., video, audio, etc.), utility accounts, security accounts, financial accounts, and the like) and display the content on the display 160 of the user computing device. For example, the web browser's 140 rendering engine may display content on a user interface (e.g., a graphical user interface). For example, the content may be provided to the web browser 140 via the server computing system 300.

In FIG. 2, the user computing device 100 includes an input device 150 configured to receive an input from a user and may include, for example, one or more of a keyboard (e.g., a physical keyboard, virtual keyboard, etc.), a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), a track ball, a remote controller, a portable (e.g., a cellular or smart) phone, a tablet PC, a pedal or footswitch, a virtual-reality device, and so on. The input device 150 may also be embodied by a touch-sensitive display having a touchscreen capability, for example. The input device 150 may be used by a user of the user computing device 100 to provide an input to select a user interface element of a user interface which is displayed on the display 160 of the user computing device 100. For example, the input may be a voice input, a touch input, a gesture input, a click via a mouse, and so on. In some implementations, a user may actively provide an input to the user computing device 100 to request a recommendation for a user interface element to select.

In FIG. 2, the user computing device 100 includes a display 160 which displays information viewable by the user, for example on a user interface (e.g., a graphical user interface). For example, the display 160 may be a non-touch sensitive display or a touch-sensitive display. The display 160 may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not limited to these example displays and may include other types of displays.

In FIG. 2, the user computing device 100 includes an output device 170 configured to provide an output to the user and may include, for example, one or more of an audio device (e.g., one or more speakers), a haptic device to provide haptic feedback to a user, a light source (e.g., one or more light sources such as LEDs which provide visual feedback to a user), and the like. For example, in some implementations of the disclosure a recommendation for a user to select a particular user interface element may be provided via an audio output (e.g., via one or more speakers) which identifies the user interface element for selection by the user of the user computing device 100. For example, in some implementations of the disclosure a recommendation for a user to select a particular user interface element may be provided via a haptic device. For example, the haptic device may be activated to alert the user of the user interface element for selection by the user of the user computing device 100. In some implementations the haptic device may be activated when a user is determined to be gazing (e.g., by a gaze sensor of the user computing device 100) at the user interface element recommended for selection. In some implementations the haptic device may be activated when a cursor of a mouse is determined by the user computing device 100 to be hovering over the user interface element recommended for selection. In some implementations the haptic device may be activated when a touch device (e.g., a finger or stylus) is determined by the user computing device 100 to be hovering over the user interface element recommended for selection. For example, in some implementations of the disclosure a recommendation for a user to select a particular user interface element may be provided via one or more light sources. For example, the one or more light sources may be activated (e.g., via blinking or changing to a certain color) according to similar conditions as described above with respect to the haptic device. For example, in some implementations of the disclosure a recommendation for a user to select a particular user interface element may be provided via a combination of one or more of the one or more light speakers, the haptic device, and the one or more light sources.

In accordance with example embodiments described herein, the server computing system 300 can include one or more processor(s) 310 and memory 320 which were previously discussed above. The server computing system 300 may also include a user interface generator 330 and a user interface element recommender 332.

For example, the user interface generator 330 may generate a user interface for display on the display 160 of the user computing device 100. The user interface may include a plurality of user interface elements that are selectable via an input to the user computing device 100. In some implementations, the user interface may be displayed in association with an application 130 being executed (at least partially) at the user computing device 100. In some implementations, the user interface may be displayed in association with web browser 140 being executed (at least partially) at the user computing device 100.

For example, the user interface element recommender 332 may generate a recommendation of a user interface element for selection by a user of the user computing device 100. Details regarding the generation of the recommendation are discussed in more detail with respect to FIG. 3.

Additional aspects of the user computing device 100 and server computing system 300 will be discussed in view of the following illustrations shown in FIGS. 3 through 6C and the flow diagrams of FIGS. 7-8.

Figure 3:
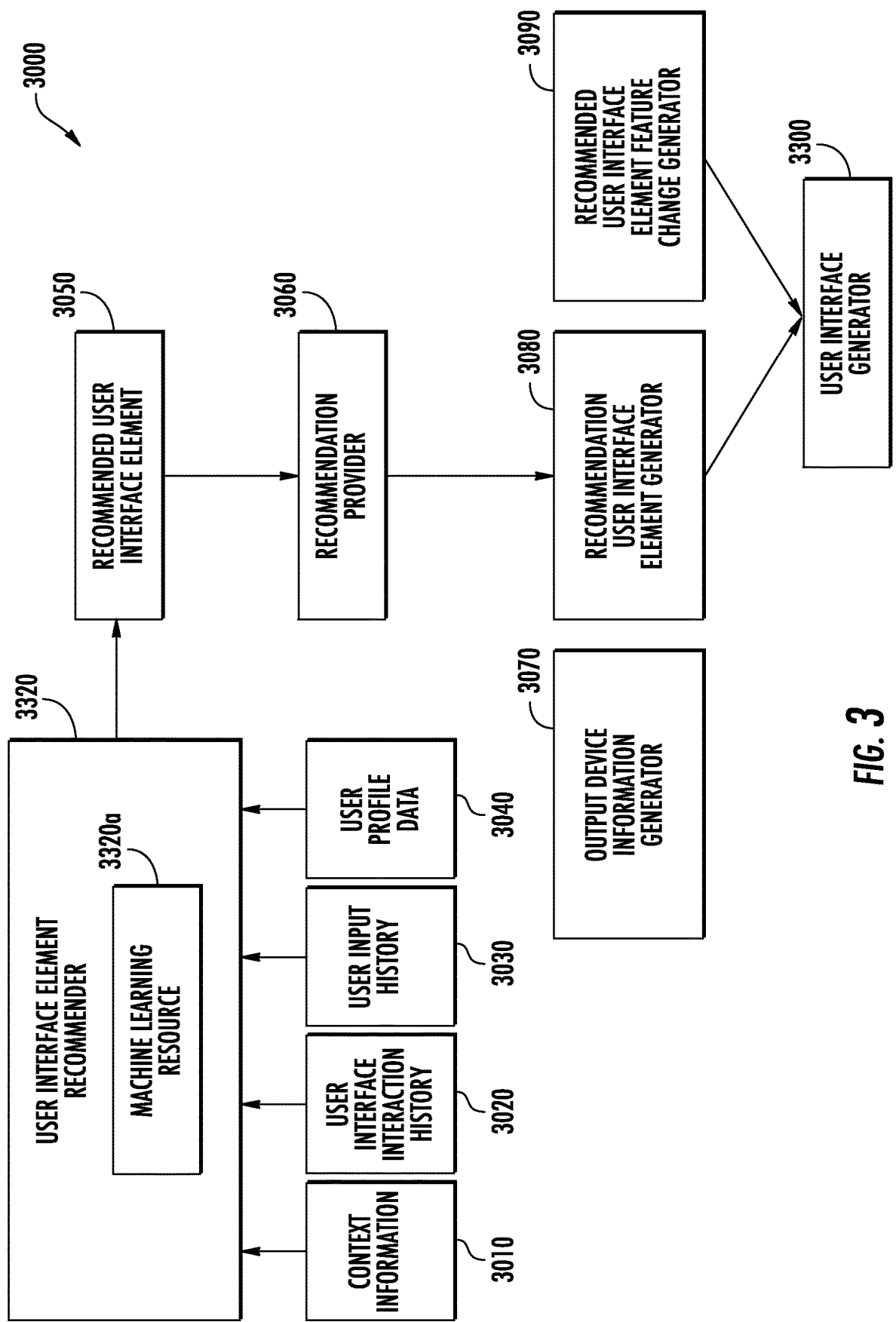
FIG. 3 depicts an example system for generating a recommendation for a user interface element to select, according to one or more example embodiments of the disclosure.

FIG. 3 depicts an example system for generating a recommendation for a user interface element to select, according to one or more example embodiments of the disclosure.

In some implementations, one or more of the user interface element recommender 3320, the recommendation provider 3060, the output device information generator 3070, recommendation user interface element generator 3080, recommended user interface element feature change generator 3090, and user interface generator 3300 may be part of the server computing system 300 (e.g., as part of a single server or distributed between a plurality of servers and/or data stores). For example, the user interface element recommender 3320 may correspond to user interface element recommender 332 illustrated in FIG. 2 and the user interface generator 3300 may correspond to user interface generator 330 illustrated in FIG. 2.

In some implementations, one or more of the user interface element recommender 3320, the recommendation provider 3060, the output device information generator 3070, recommendation user interface element generator 3080, recommended user interface element feature change generator 3090, and user interface generator 3300 may be included in the user computing device 100. For example, in some implementations the user computing device 100 itself may determine a user interface element to recommend for selection by the user of the user computing device 100.

The example system 3000 includes the user interface element recommender 3320 which receives as inputs, for example, context information 3010, user interface interaction history 3020, user input history 3030, user profile data 3040.

For example, the context information 3010 may include contextual factors such as time of day, weather, a category or genre of content associated with the user interface that is currently displayed, a type of device being used to access or view the user interface, traffic information, and the like. For example, the context information 3010 may be obtained from the contextual information data store 370 and/or external content 400. The user interface element recommender 3320 may consider a similarity between a context of the user of the user computing device 100 and a context of other users of user computing devices when recommending a user interface element to select. For example, the user interface element recommender 3320 may be more likely to suggest a user interface element which was selected by previous users at a similar time that the user of the user computing device 100 is viewing the user interface. For example, if a user of the user computing device 100 is viewing a user interface having a map at a time of 6 p.m., the user interface element recommender 3320 may be more likely to recommend a first user interface element previously selected by users at a time close to or at 6 p.m. compared to other user interface elements selected (e.g., at a same frequency as the first user interface element) by users at different times.

For example, the user interface interaction history 3020 may include information regarding previous users' interactions with the user interface. For example, the user interface interaction history 3020 may be obtained from the user interface history information data store 380. The user interface interaction history 3020 can include a record of selections of user interface elements of the user interface. For example, the user interface interaction history 3020 can include time information associated with the record of selections of user interface elements of the user interface. For example, the selections of user interface elements of the user interface may be associated with a first time that each user was provided with the user interface. The user interface interaction history 3020 may be used by the user interface element recommender 3320 to determine a most often selected user interface element of the plurality of user interface elements. The user interface interaction history 3020 may be used by the user interface element recommender 3320 to determine the most recently selected user interface elements of the plurality of user interface elements. The user interface history information may also include the selections of user interface elements of the user interface of the user of the user computing device 100, if it is not the first time that the user has been provided with the user interface. The user interface element recommender 3320 may be more likely to suggest a user interface element which was selected more often and/or more recently by previous users. As an example, if a first user interface element was selected more frequently than a second user interface element in the last 30 days, the user interface element recommender 3320 may be more likely to recommend the first user interface element. As another example, if the user has previously been provided the user interface and has a history of selecting user interface elements, the user interface element recommender 3320 may be more likely to recommend a user interface element that the user has not selected previously.

For example, the user input history 3030 may include information regarding previous inputs received by user computing devices prior to users' being provided with the user interface. For example, the user input history 3030 may be obtained from the user interface history information data store 380. The user input history 3030 can include a record of inputs received by user computing devices before the user interface is provided to each respective user. For example, the user input history 3030 can include time information associated with the record of inputs before reaching the user interface. For example, the record of inputs may be associated with a first time that each user was provided with the user interface. The user input history 3030 may be used by the user interface element recommender 3320 to determine a user interface element of the plurality of user interface elements to recommend for selection by the user of the user computing device 100. For example, the user interface element recommender 3320 may analyze previous inputs the user computing device 100 received from the user to reach the user interface. As an example, the user interface element recommender 3320 may determine the user computing device 100 received three inputs (e.g., input A, input B, and input C) from the user to reach the user interface. The user interface element recommender 3320 may analyze the inputs that were received by user computing devices from other users (e.g., input D, input B, and input C or input E, input F, and input C, or input A, input B, and input C, etc.). The user interface element recommender 3320 may be more likely to suggest a user interface element which was selected by users who input a same sequence of inputs to a user computing device before being provided with the user interface. In accordance with the above-mentioned example, all else being equal, a first user interface element which was selected by a user of a user computing device which received input A, input B, and input C before the user interface was provided may be more likely to be recommended for selection compared to other user interface elements which were selected by users of user computing devices which received a different sequence of inputs before the user interface was provided. In some implementations, the user interface element recommender 3320 may consider all of the inputs received by the user computing devices, or a portion of the inputs received by the user computing devices in determining a user interface element to recommend for selection by the user of the user computing device 100. For example, the user interface element recommender 3320 may limit the number of inputs considered (e.g., three or less inputs received before the user interface was provided). For example, the user interface element recommender 3320 may limit the number of inputs considered to those inputs received when the application was opened, or to a time from when a website having a web page with the user interface was accessed.

For example, the user profile data 3040 may include information regarding one or more user profiles of users who have previously interacted with the user interface. For example, the user profile data 3040 may include information regarding the user of the user computing device 100 regardless of whether the user has been provided the user interface before or interacted with the user interface before. For example, the user profile data 3040 may be obtained from the user profile data store 390. The user profile data 3040 can include a variety of user data such as user preference data, user demographic data, user calendar data, user social network data, user historical travel data, and the like. The user profile data 340 can be used by the user interface element recommender 3320 to determine a user interface element of the plurality of user interface elements to recommend. For example, the user interface element recommender 3320 may be more likely to suggest a first user interface element which was selected by a previous user who is more similar to the user of the user computing device 100 (e.g., having similar preferences, a similar age, etc.) compared to other user interface elements selected (e.g., at a same frequency as the first user interface element) by users who are less similar to the user of the user computing device 100 (e.g., different preferences, large age differences, etc.).

Referring to FIG. 3, the user interface element recommender 3320 may determine or predict a user interface element to recommend for selection based on various factors, including one or more of the context information 3010, user interface interaction history 3020, user input history 3030, and user profile data 3040.

The user interface element recommender 3320 may include a machine learning resource 3320a which is configured to determine or predict which user interface element from the plurality of user interface elements included in the user interface is to be recommended for selection by the user of the user computing device 100 (e.g., having a confidence value greater than a threshold value that the user should be recommended a particular user interface element for selection, a probability that the user would be interested in selecting a particular user interface element, a probability that the particular user interface element may be of assistance to the user, a determination that the user interface element is most likely to be of interest or assistance to the user compared to other user interface elements based on interactions with the user interface by other users, and the like). Training data for the machine learning resource 3320a may be obtained by experiments which identify whether a suggested user interface element generated by the machine learning resource 3320a actually was of interest to the user or was of actual help to the user.

For example, the machine learning resource 3320a may be configured to identify a candidate user interface element as a user interface element for which the user interface element recommender 3320 should suggest as the first user interface element for selection by the user, based on one or more of: (1) contextual factors such as time of day, weather, a category or genre of content associated with the user interface that is currently displayed, a type of device being used to access or view the user interface, and the like, (2) interactions with the user interface by previous users, (3) historical actions with respect to an application/website by the user prior to reaching the user interface, such as a sequence of inputs (e.g., taps) made by the user leading to the user interface, (4) user profile data which indicates similarities (e.g., demographic similarities, preferences, etc.) between the user and other users who have interacted with the user interface, and the like. For example, the machine learning resource 3320a may assign a higher weight to a user interface element that has been selected (e.g., by being tapped) more frequently compared to weights assigned to other user interface elements which have been selected less frequently. For example, the machine learning resource 3320a may assign a higher weight to more recent selections of a user interface element provided on the user interface compared to weights assigned to other user interface elements selected less recently. For example, the machine learning resource 3320a may assign a higher weight to user interface elements that are selected by other users who are more similar to the user (e.g., similar age, similar education, etc.) compared to weights assigned to other user interface elements that are selected by other users who are less similar to the user. For example, the machine learning resource 3320a may assign a higher weight to a user interface element which was selected after a similar or same sequence of inputs (e.g., taps) made by the user leading to the user interface compared to other user interface elements which were selected after a different sequence of inputs (e.g., taps) made by the user leading to the user interface. For example, in some implementations if the user previously selected a user interface element from the user interface a long time ago (i.e., greater than a predetermined period of time has passed since the last selection, such as six months, one year, etc.), the machine learning resource 3320a may be configured to assign a greater weight to the user interface element which the user previously selected in determining which user interface element to recommend, with an inference being that the user may forgotten their previous selection. For example, the machine learning resource 3320a may refer to the user interface interaction history 3020 for time information associated with the record of selections of user interface elements of the user interface. For example, in some implementations if the user selected a user interface element from a different but analogous user interface (e.g., from a different application, from a website that corresponds to an application currently being executed, from an application that corresponds to a website currently being browsed, etc.), the machine learning resource 3320a may be configured to assign a greater weight to the user interface element which the user selected from the analogous user interface in determining which user interface element to recommend, with an inference being that the user likely would make a similar selection.

For example, the machine learning resource 3320a may be updated or adjusted based on an evaluation of user interactions with the user interface. For example, if users generally do not interact with (i.e., select) the suggested user interface element (e.g., the first user interface element), there may be an implication that the first user interface element is not of interest or assistance to the user with respect to the content of the user interface. Accordingly, the machine learning resource 3320a may be adjusted to reflect the user interactions (or lack thereof) with the user interface. Likewise, if users generally do interact with the suggested user interface element (e.g., the first user interface element), there may be an implication that the first user interface element is of interest or assistance to the user with respect to the content of the user interface. Accordingly, the machine learning resource 3320a may be adjusted to reflect the user interactions with the user interface, and different user interface elements may be recommended for selection after the machine learning resource 3320a is updated or adjusted. In some implementations, data corresponding to user interactions with the user interface after a recommendation is provided can be used to analyze the effectiveness of the user interface. For example, it may be inferred that a user interface is confusing or ineffective if users frequently select recommended user interface elements after being provided a recommendation. Therefore, data corresponding to user interactions with the user interface after a recommendation is provided may be collected (e.g., as part of the user interface interaction history 3020 where the recommended user interface element 3050 may be associated with the user interface interaction history 3020) and used as a feedback loop to subsequently improve the user interface. For example, the server computing system 300 may be configured to change at least one feature (e.g., a size, a location, a color, etc.) of at least one user interface element of the user interface in response to analyzing the collected data corresponding to the user interactions with the user interface after the recommendation is provided (e.g., in response to the collected data indicating users frequently select the recommended user interface element).

The machine learning resource 3320a may dynamically determine or predict which user interface element of the plurality of user interface elements included in the user interface is to be recommended for selection by the user of the user computing device 100 in response to the server computing system 300 determining the user computing device 100 has not received a selection of one of the plurality of user interface elements after a predetermined period of time. For example, the server computing system 300 may determine the user computing device 100 has not received a selection of one of the plurality of user interface elements after the predetermined period of time by tracking or analyzing log activity between the user computing device 100 and the server computing system 300. For example, the server computing system 300 may determine the user computing device 100 has not received a selection of one of the plurality of user interface elements after the predetermined period of time by receiving a request from the user computing device 100 for a recommendation of a user interface element of the plurality of user interface elements to suggest to a user of the user computing device 100. In some implementations, the machine learning resource 3320a may dynamically determine or predict which user interface element of the plurality of user interface elements included in the user interface is recommended for selection by the user of the user computing device 100 in response to the user computing device 100 receiving an input from the user requesting a recommendation of a user interface element of the plurality of user interface elements included in the user interface to select. The user computing device 100 may transmit the request for the recommendation to the server computing system 300. In some implementations, when the user computing device 100 includes the machine learning resource 3320a, the machine learning resource 3320a may determine or predict which user interface element of the plurality of user interface elements included in the user interface is recommended for selection by the user of the user computing device 100. In some implementations, when the user computing device 100 includes the machine learning resource 3320a, the machine learning resource 3320a may dynamically determine or predict which user interface element of the plurality of user interface elements included in the user interface is recommended for selection by the user of the user computing device 100 in response to the user computing device 100 not receiving a selection of one of the user interface elements for the predetermined period of time.

The user interface element recommender 3320 outputs a recommended user interface element 3050, for example, based on the determination or prediction by the machine learning resource 3320a described above. The example system 3000 includes the recommendation provider 3060 which is configured to provide information relating to the recommended user interface element 3050. For example, the recommendation provider 3060 may provide the information relating to the recommended user interface element 3050 via one or more of the output device information generator 3070, the recommendation user interface element generator 3080, and the recommended user interface element feature change generator 3090.

For example, the recommendation provider 3060 may generate information relating to the recommended user interface element 3050 such as output device information generated by the output device information generator 3070. The output device information generated by the output device information generator 3070 may include information for the user computing device 100 to provide an output via one or more of an audio device, a haptic device, a light source, and the like, indicating the user interface element of the plurality of user interface elements to be selected by the user of the user computing device 100.

For example, the recommendation provider 3060 may generate a recommendation user interface element via the recommendation user interface element generator 3080. The recommendation user interface element which is generated by the recommendation user interface element generator 3080 may be included in the user interface generated by the user interface generator 3300 and provided for display on the display 160 of the user computing device 100. The recommendation user interface element which is generated by the recommendation user interface element generator 3080 may include a text summary related to the recommended user interface element 3050 and/or an image related to the recommended user interface element 3050. In some implementations, the text summary and/or image may be generated using generic expressions which are modified based on the recommended user interface element 3050. In some implementations, the text summary and/or image may be intelligently generated based on a context of the user interface and based on the recommended user interface element 3050. Information regarding a location where the recommendation user interface element is to be provided on the user interface may also be included by the recommendation user interface element generator 3080.

For example, the recommendation provider 3060 may generate information relating to one or more features to change with respect to the recommended user interface element 3050 via the recommended user interface element feature change generator 3090. For example, the recommended user interface element feature change generator 3090 may determine or generate one or more features of the recommended user interface element 3050 to modify (e.g., by highlighting the user interface element, changing a color of the user interface element, changing a size of the user interface element, etc.). Information relating to the one or more features of the recommended user interface element 3050 which are to be modified may be communicated to the user interface generator 3300. The user interface generator 3300 may generate the user interface having the recommended user interface element 3050 as modified according to the information, and the user interface having the modified recommended user interface element 3050 may be provided for display on the display 160 of the user computing device 100.

User interface generator 3300 may be configured to generate the user interface that is to be provided for display on the display 160 of the user computing device 100. In some implementations, some aspects of the rendering of the user interface may be performed at the user computing device 100. In some implementations, some aspects of the rendering of the user interface may be performed at the server computing system 300.

Figure 4B:
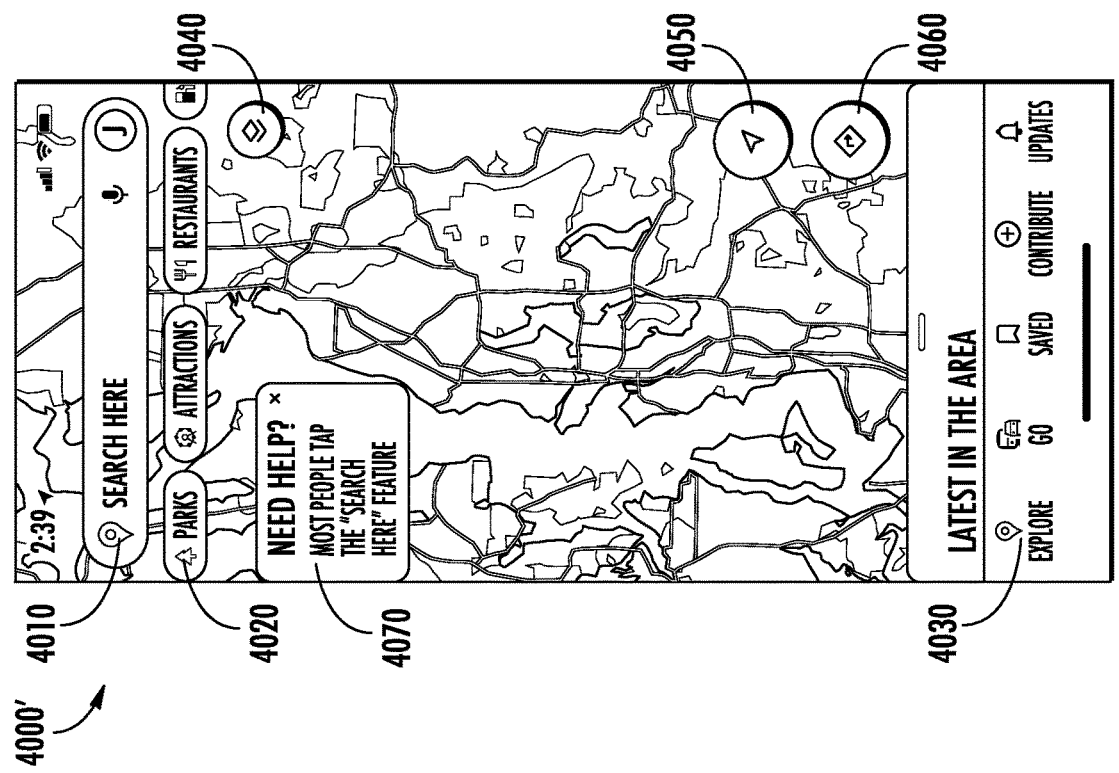
FIGS. 4A-4B depict example user interfaces in which a user interface element is recommended for selection, according to one or more example embodiments of the disclosure.
Figure 4A:
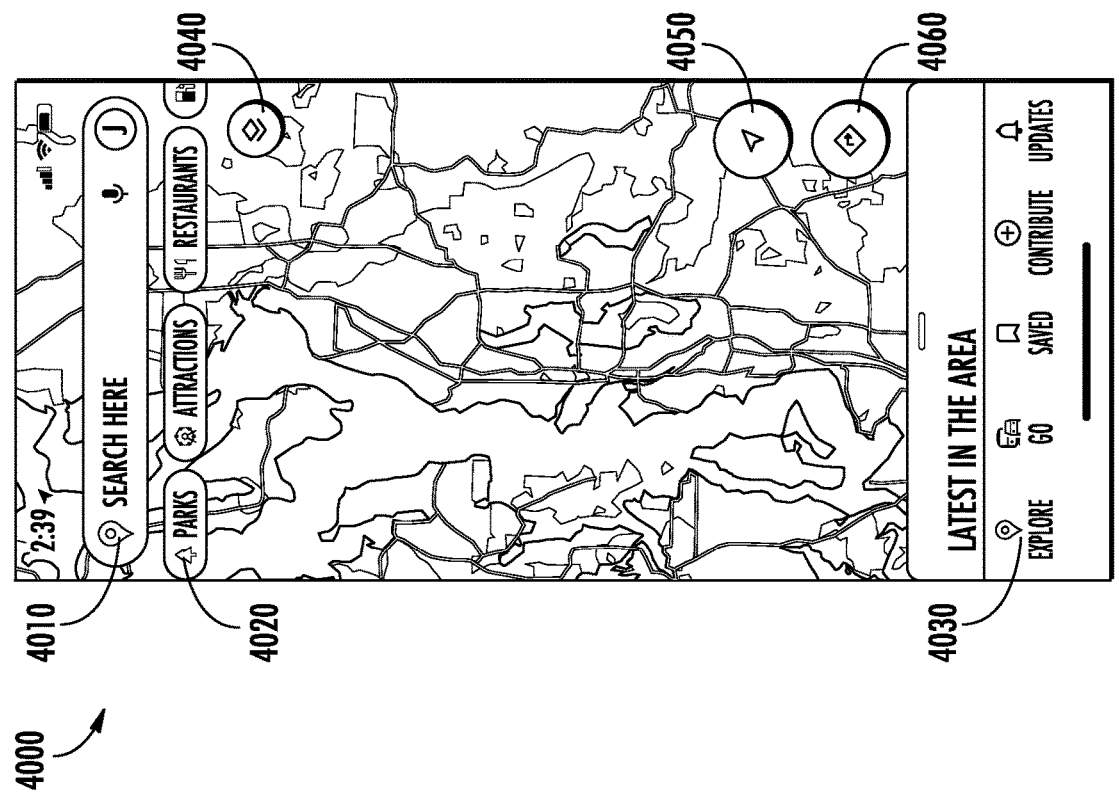

FIGS. 4A-4B depict example user interfaces in which a user interface element is recommended for selection, according to one or more example embodiments of the disclosure. Referring to FIG. 4A, an example user interface 4000 as displayed on the display 160 of user computing device 100 is shown. For example, the user interface 4000 may be associated with an application 130 (e.g., a navigation application) executed (at least partially) at the user computing device 100. The disclosure is not limited to the example user interface 4000 and other user interfaces associated with other applications (e.g., a media player application, a climate control application, a security application, a financial application, and the like) are within the scope of the disclosure. For example, the user interface 4000 may be a user interface that is associated with a website or web page (e.g., which displays a map) that is provided via the one or more web browsers 140 of the user computing device 100. The disclosure is not limited to the example user interface 4000 and other user interfaces associated with other websites or web pages (e.g., websites or web pages which provide content relating to media, utility accounts, security accounts, financial accounts, and the like) are within the scope of the disclosure.

As illustrated in FIG. 4A, the user interface 4000 provided to the user computing device 100 includes a plurality of user interface elements. Example user interface elements denoted with reference characters include first user interface element 4010, second user interface element 4020, third user interface element 4030, fourth user interface element 4040, fifth user interface element 4050, and sixth user interface element 4060.

As discussed above, in some instances a user of the user computing device 100 may be provided with the user interface (e.g., for a first time) and may be unsure of which user interface element to interact with. In accordance with examples of the disclosure, the user of the user computing device 100 may be provided with a recommendation to select one of the user interface elements after the user interface is provided and the user computing device 100 does not receive a selection of one of the user interface elements for a predetermined period of time. Example methods for generating the recommendation are described elsewhere (e.g., with respect to FIG. 3), and are not repeated again for the sake of brevity.

Referring to FIG. 4B, the user computing device 100 is provided with a user interface 4000' including the plurality of user interface elements (e.g., first user interface element 4010, second user interface element 4020, third user interface element 4030, fourth user interface element 4040, fifth user interface element 4050, and sixth user interface element 4060) and additionally with a recommendation user interface element 4070. The recommendation user interface element 4070 may include a text summary and/or an image related to the user interface element which is recommended for selection. In FIG. 4B, recommendation user interface element 4070 includes a text summary (Need help? Most people tap the "Search here" feature), which indicates that the first user interface element 4010 is recommended for selection by the user. The disclosure is not limited to the example recommendation user interface element 4070 illustrated in FIG. 4B. For example, the recommendation user interface element 4070 may include an image indicating the user interface element recommended for selection, may include a different text summary, and may be in other forms (e.g., a transparent user interface element, having a different size or shape, be in the form of a pop-up, etc.). In some implementations, the recommendation user interface element 4070 may be disposed adjacent to the user interface element recommended for selection so that the user of the user computing device 100 may more easily identify the user interface element recommended for selection. In some implementations, the recommendation user interface element 4070 may include a portion (e.g., a line) which is connected to the user interface element recommended for selection so that the user of the user computing device 100 may more easily identify the user interface element recommended for selection.

Figure 5B:
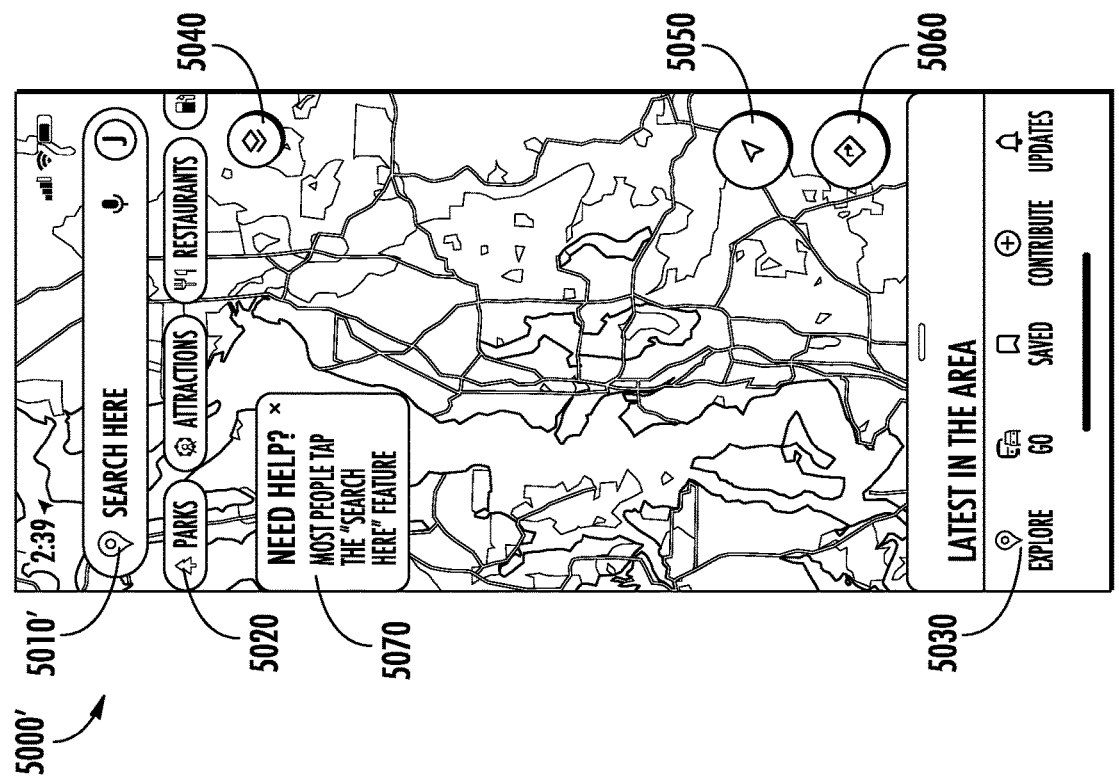
FIGS. 5A and 5B depict example user interfaces in which a user interface element is recommended for selection, according to one or more example embodiments of the disclosure.
Figure 5A:
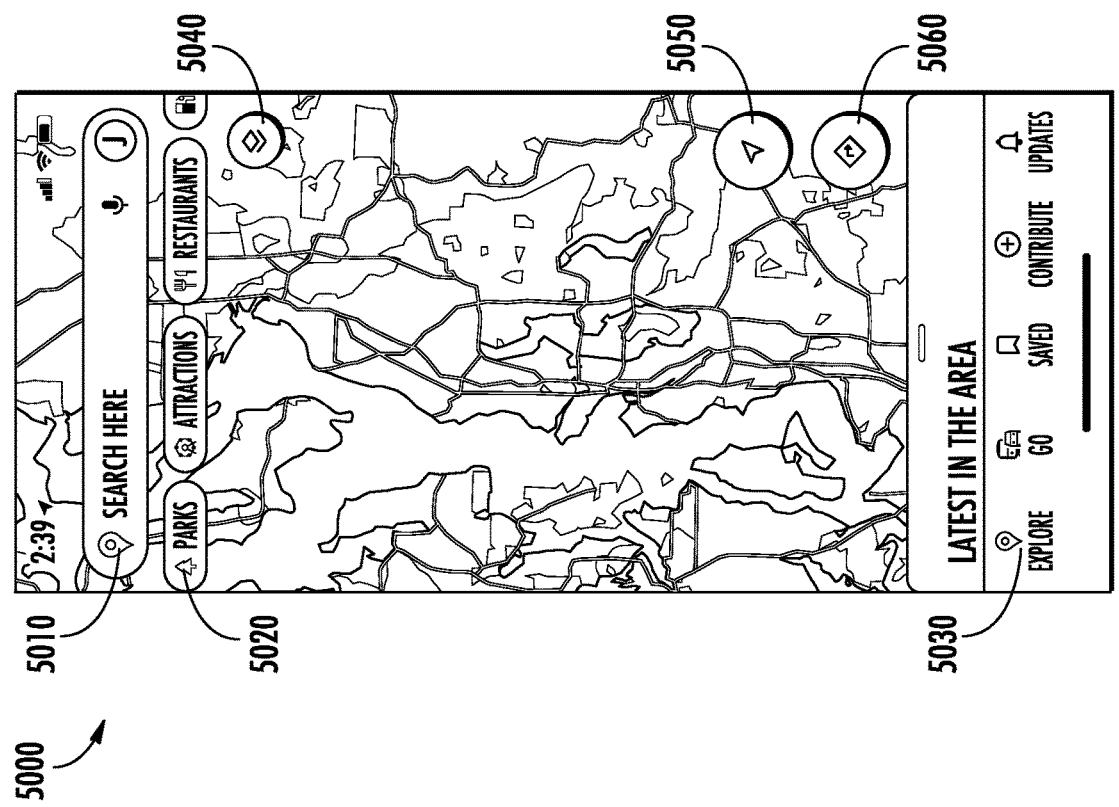

FIGS. 5A-5B depict example user interfaces in which a user interface element is recommended for selection, according to one or more example embodiments of the disclosure. Referring to FIG. 5A, an example user interface 5000 as displayed on the display 160 of user computing device 100 is shown. For example, the user interface 5000 may be associated with an application 130 (e.g., a navigation application) executed (at least partially) at the user computing device 100. The disclosure is not limited to the example user interface 5000 and other user interfaces associated with other applications (e.g., a media player application, a climate control application, a security application, a financial application, and the like) are within the scope of the disclosure. For example, the user interface 5000 may be a user interface that is associated with a website or web page (e.g., which displays a map) that is provided via the one or more web browsers 140 of the user computing device 100. The disclosure is not limited to the example user interface 5000 and other user interfaces associated with other websites or web pages (e.g., websites or web pages which provide content relating to media, utility accounts, security accounts, financial accounts, and the like) are within the scope of the disclosure.

As illustrated in FIG. 5A, the user interface 5000 provided to the user computing device 100 includes a plurality of user interface elements. Example user interface elements denoted with reference characters include first user interface element 5010, second user interface element 5020, third user interface element 5030, fourth user interface element 5040, fifth user interface element 5050, and sixth user interface element 5060.

As discussed above, in some instances a user of the user computing device 100 may be provided with the user interface (e.g., for a first time) and may be unsure of which user interface element to interact with. In accordance with examples of the disclosure, the user of the user computing device 100 may be provided with a recommendation to select one of the user interface elements after the user interface is provided and the user computing device 100 does not receive a selection of one of the user interface elements for a predetermined period of time. Example methods for generating the recommendation are described elsewhere (e.g., with respect to FIG. 3), and are not repeated again for the sake of brevity.

Referring to FIG. 5B, the user computing device 100 is provided with a user interface 5000' including the plurality of user interface elements (e.g., first user interface element 5010, second user interface element 5020, third user interface element 5030, fourth user interface element 5040, fifth user interface element 5050, and sixth user interface element 5060) and additionally with a recommendation user interface element 5070. The recommendation user interface element 5070 may include a text summary and/or an image related to the user interface element which is recommended for selection. In FIG. 5B, recommendation user interface element 5070 includes a text summary (Need help? Most people tap the "Search here" feature), which indicates that the first user interface element 5010 from FIG. 5A (modified in the example as discussed below) is recommended for selection by the user. In some implementations, the recommendation user interface element 5070 may be disposed adjacent to the user interface element recommended for selection so that the user of the user computing device 100 may more easily identify the user interface element recommended for selection. In addition, to indicate the user interface element recommended for selection (in this example first user interface element 5010), features of the first user interface element 5010 as shown in FIG. 5A have been changed, as illustrated with respect to the modified first user interface element 5010'. As illustrated in FIG. 5B, the first user interface element 5010 from FIG. 5A has been modified by highlighting a portion of the first user interface element 5010, by increasing a size of the font of the text "Search here", and by bolding the text "Search here" to generate modified first user interface element 5010'. The disclosure is not limited to this example, and other methods for changing a feature of the recommended user interface element may be implemented (e.g., by changing a color of the first user interface element). In the example of FIG. 5B, a combination of methods is used by the user computing device 100 to provide the recommendation of the modified first user interface element 5010' for selection (e.g., by using a recommendation user interface element 5070 and by changing one or more features of the first user interface element 5010). However, in other implementations one of the methods may be used (e.g., changing one or more features of the first user interface element 5010) to provide the recommendation, additional methods may be used, or alternative methods may be used (e.g., by providing an audio output, haptic feedback, etc.).

Figure 6B:
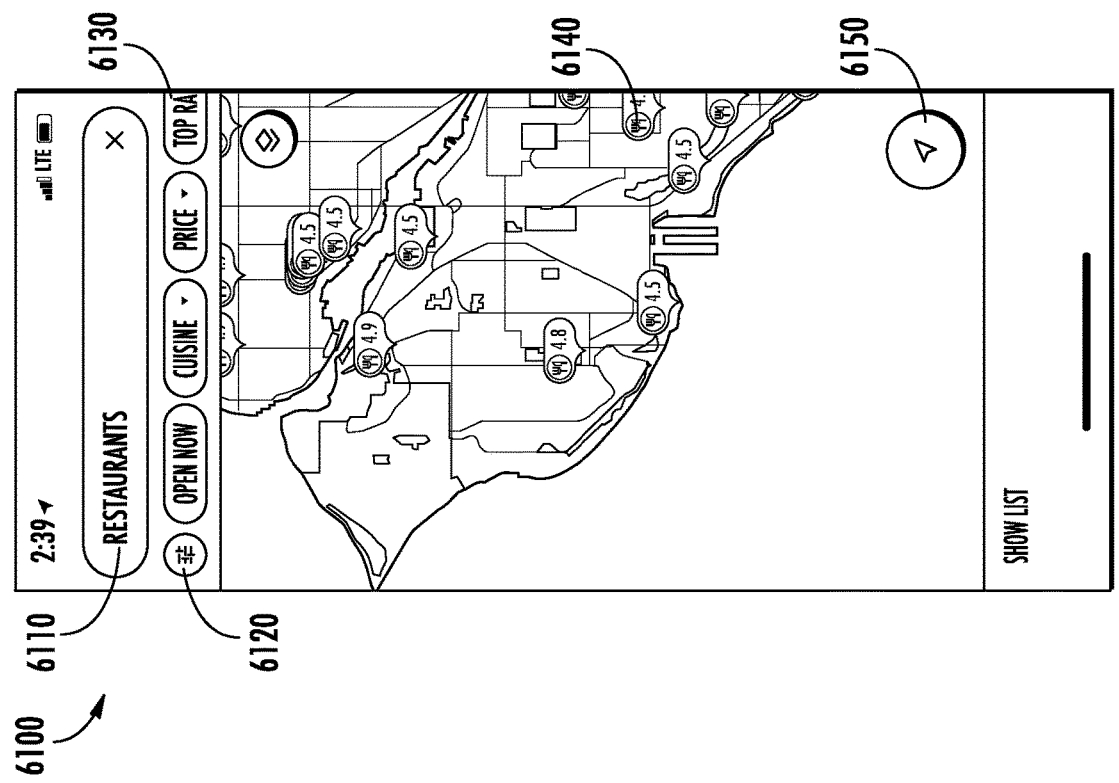
FIGS. 6A-6C depict example user interfaces in which a user interface element is recommended for selection, according to one or more example embodiments of the disclosure.
Figure 6A:
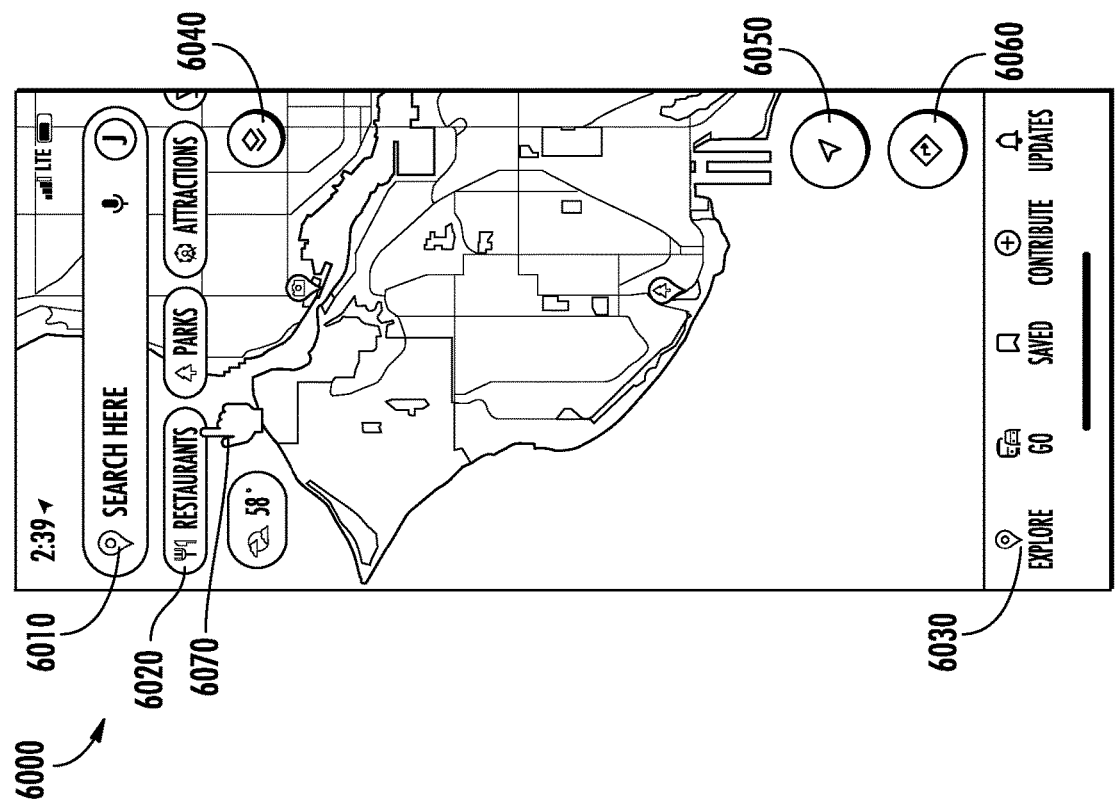
Figure 6C:
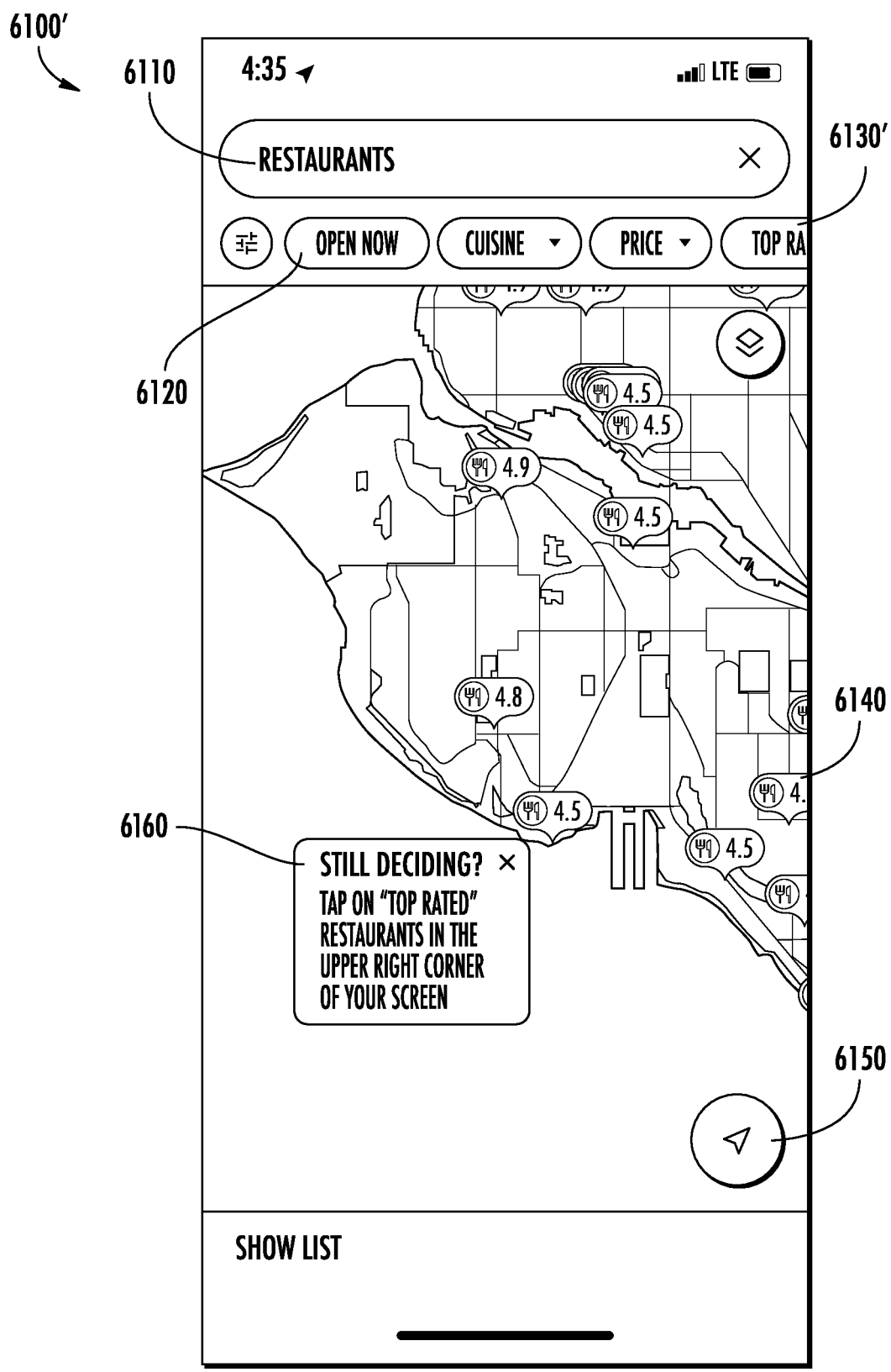

FIGS. 6A-6C depict example user interfaces in which a user interface element is recommended for selection, according to one or more example embodiments of the disclosure. Referring to FIG. 6A, an example user interface 6000 as displayed on the display 160 of user computing device 100 is shown. For example, the user interface 5000 may be associated with an application 130 (e.g., a navigation application) executed (at least partially) at the user computing device 100. The disclosure is not limited to the example user interface 6000 and other user interfaces associated with other applications (e.g., a media player application, a climate control application, a security application, a financial application, and the like) are within the scope of the disclosure. For example, the user interface 6000 may be a user interface that is associated with a website or web page (e.g., which displays a map) that is provided via the one or more web browsers 140 of the user computing device 100. The disclosure is not limited to the example user interface 6000 and other user interfaces associated with other websites or web pages (e.g., websites or web pages which provide content relating to media, utility accounts, security accounts, financial accounts, and the like) are within the scope of the disclosure.

As illustrated in FIG. 6A, the user interface 6000 provided to the user computing device 100 includes a plurality of user interface elements. Example user interface elements denoted with reference characters include first user interface element 6010, second user interface element 6020, third user interface element 6030, fourth user interface element 6040, fifth user interface element 6050, and sixth user interface element 6060. Further illustrated in FIG. 6A is an input 6070 which is received by the user computing device 100 selecting second user interface element 6020 which corresponds to a user interface element that causes a search for restaurants in the geographic area shown on the user interface 6000 and the associated application or associated web browser to provide user interface 6100 as illustrated in FIG. 6B. For example, FIG. 6B illustrates the input 6070 as a touch input from the user of the user computing device 100 to the user interface 6000. In other examples, the input 6070 may be in the form of a voice input, gesture input, clicking of a mouse button, and the like.

Referring to FIG. 6B, the user computing device 100 is provided with a user interface 6100 including a plurality of user interface elements, in response to the selection of second user interface element 6020. Example user interface elements denoted with reference characters include first user interface element 6110, second user interface element 6120, third user interface element 6130, fourth user interface element 6140, and fifth user interface element 6150.

As discussed above, in some instances a user of the user computing device 100 may be provided with the user interface (e.g., for a first time) and may be unsure of which user interface element to interact with. In accordance with examples of the disclosure, the user of the user computing device 100 may be provided with a recommendation to select one of the user interface elements after the user interface is provided and the user computing device 100 does not receive a selection of one of the user interface elements for a predetermined period of time. Example methods for generating the recommendation are described elsewhere (e.g., with respect to FIG. 3), and are not repeated again for the sake of brevity.

Referring to FIG. 6C, the user computing device 100 is provided with a user interface 6100' including the plurality of user interface elements (e.g., first user interface element 6110, second user interface element 6120, third user interface element 6130', fourth user interface element 6140, and fifth user interface element 6150) and additionally with a recommendation user interface element 6160. The recommendation user interface element 6160 may include a text summary and/or an image related to the user interface element which is recommended for selection. In FIG. 6C, recommendation user interface element 6160 includes a text summary (Still deciding? Tap on "Top rated" restaurants in the upper right corner of your screen), which indicates that the third user interface element 6130 from FIG. 6B (modified in the example as discussed below) is recommended for selection by the user. In some implementations, the recommendation user interface element 6160 may be disposed adjacent to the user interface element recommended for selection so that the user of the user computing device 100 may more easily identify the user interface element recommended for selection. In addition, to indicate the user interface element recommended for selection (in this example third user interface element 6130), features of the third user interface element 6130 as shown in FIG. 6B have been changed, as illustrated with respect to the modified third user interface element 6130'. As illustrated in FIG. 6C, the third user interface element 6130 has been modified by highlighting a portion of the third user interface element 6130 and by changing a color of the text "Top rated." The disclosure is not limited to this example, and other methods for changing a feature of the recommended user interface element may be implemented (e.g., by changing a color of the first user interface element). In the example of FIG. 6C, a combination of methods is used by the user computing device 100 to provide the recommendation of the modified third user interface element 6130' for selection (e.g., by using a recommendation user interface element 6160 and by changing one or more features of the third user interface element 6130). However, in other implementations one of the methods may be used (e.g., changing one or more features of the third user interface element 6130) to provide the recommendation, additional methods may be used, or alternative methods may be used (e.g., by providing an audio output, haptic feedback, etc.).

In addition, the example embodiment of FIGS. 6A-6C includes the consideration that the recommendation for the selection of the third user interface element 6130 may be based on previous inputs received by the user computing device 100 leading to the user interface 6100 being provided to the user computing device 100. For example, a user interface element may be recommended for selection based on a sequence of inputs received by the user computing device 100 prior to arriving at the user interface. In the example embodiment of FIGS. 6A-6C, the third user interface element 6130 may be recommended for selection based on the input 6070 received by the user computing device 100 which caused the user interface 6100 to be provided after second user interface element 6020 was selected. A user interface element which is most frequently selected by other users who have provided a same input (or a same or similar sequence of inputs) prior to arriving at a user interface may be recommended for selection to a user of a user computing device. In the example embodiment of FIGS. 6A-6C, the third user interface element 6130 may be recommended for selection based on a user interface element (e.g., third user interface element 6130) which was most frequently selected by other users who also provided the input 6070 to second user interface element 6020.

Figure 7:
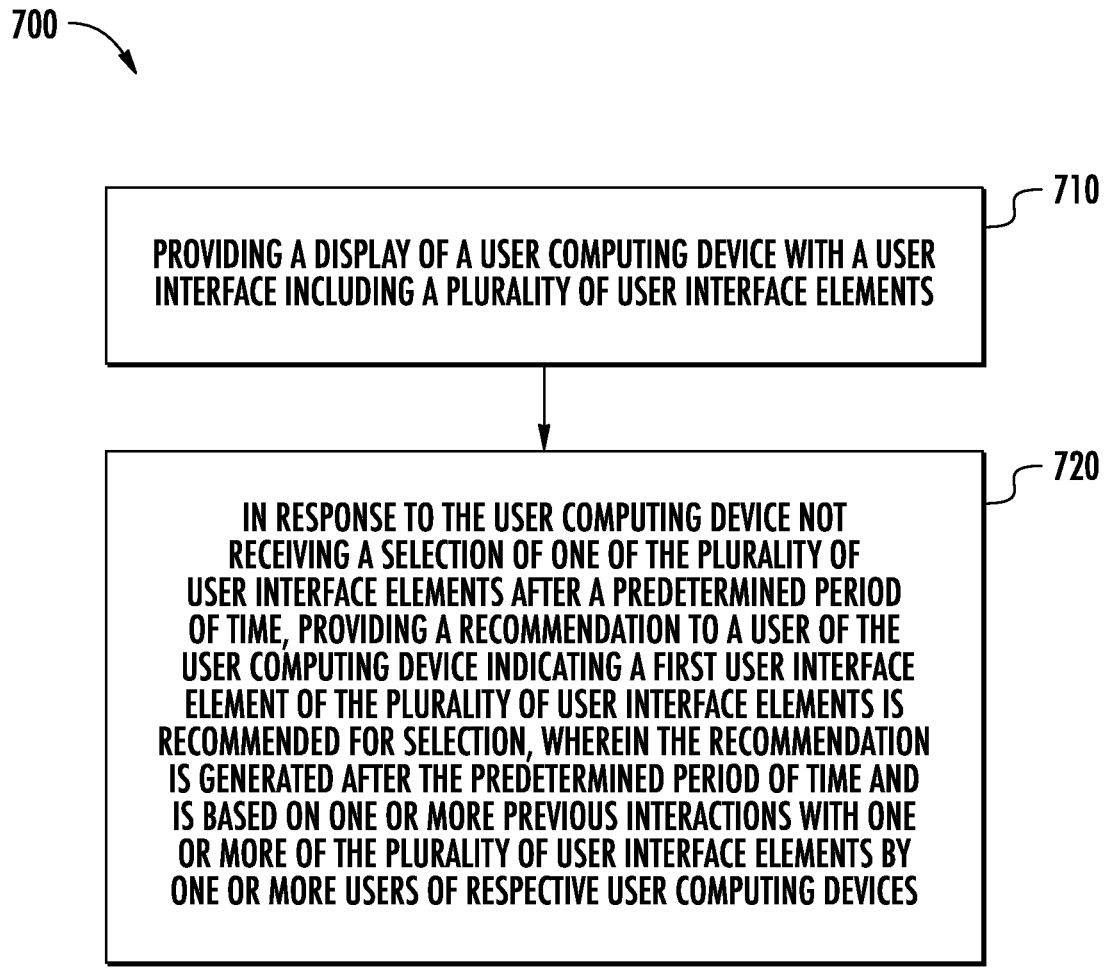
FIGS. 7-8 each illustrate flow diagrams of example, non-limiting computer-implemented methods according to one or more example embodiments of the disclosure.
Figure 8:
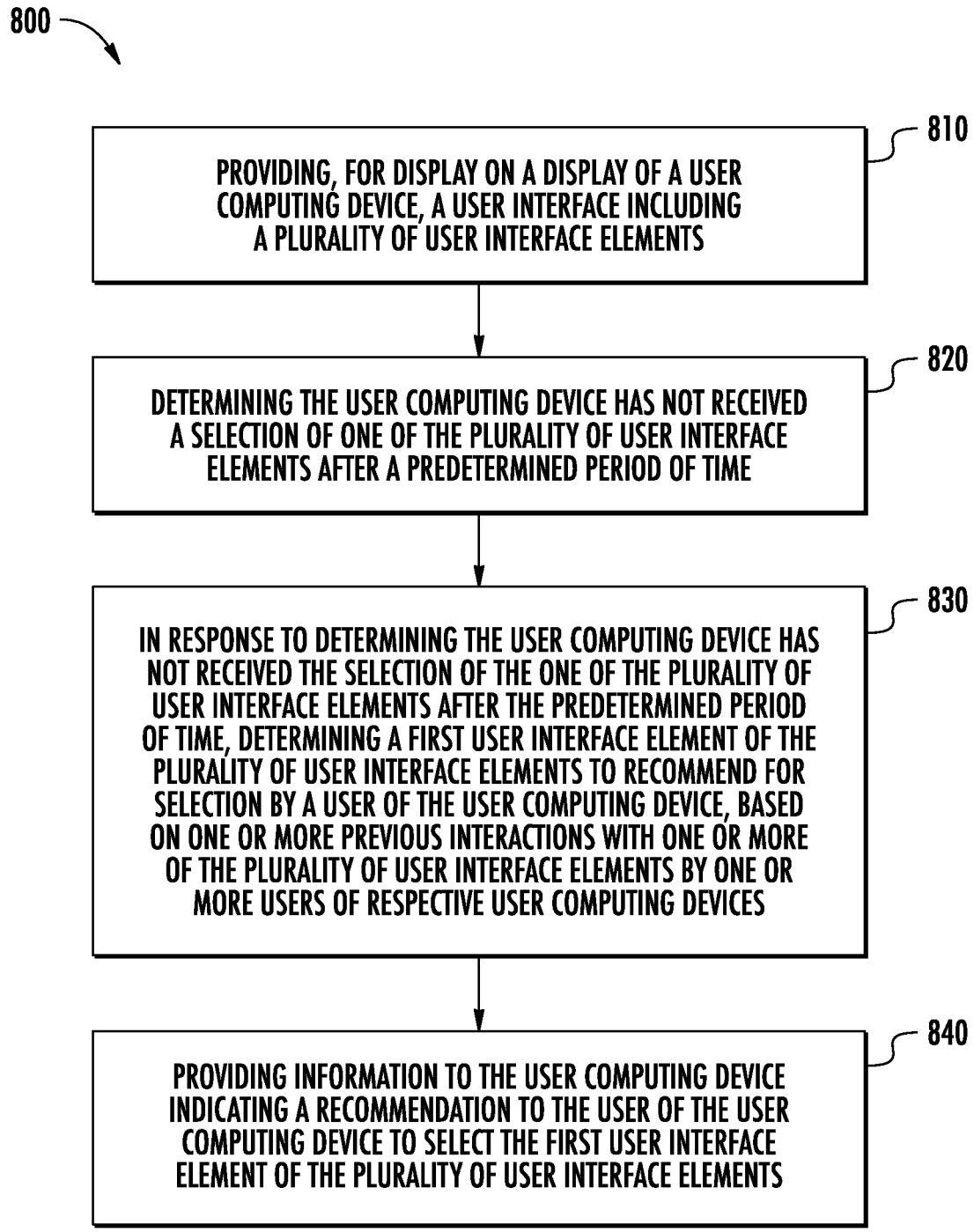

FIGS. 7-8 illustrate flow diagrams of example, non-limiting computer-implemented methods according to one or more example embodiments of the disclosure.

Referring to FIG. 7, the method 700 includes operation 710 of the user computing device 100 providing a display 160 of a user computing device 100 with a user interface including a plurality of user interface elements. For example, the user interface may be a user interface that is associated with an application 130 that is being executed (at least partially) by the user computing device 100. For example, the user interface may be a user interface that is associated with a website or web page that is provided via the one or more web browsers 140 of the user computing device 100.

At operation 720 the method 700 includes the user computing device 100, in response to not receiving a selection of one of the plurality of user interface elements after a predetermined period of time, providing a recommendation to a user of the user computing device 100 indicating a first user interface element of the plurality of user interface elements is recommended for selection. The recommendation is generated after the predetermined period of time and is based on one or more previous interactions with one or more of the plurality of user interface elements by one or more users of respective user computing devices. Here, the one or more users of the respective user computing devices may include the user of the user computing device 100. In another implementation, the one or more users of the respective user computing devices may include the user of the user computing device 100 as well as other users of other user computing devices. In still another implementation, the one or more users of the respective user computing devices may include only one or more users of user computing devices other than the user of the user computing device 100.

For example, in some implementations the user computing device 100 receives information from the server computing system 300 indicating a first user interface element of the plurality of user interface elements is recommended for selection, based on one or more previous interactions with one or more of the plurality of user interface elements by one or more users other than a user of the user computing device 100. For example, in response to a user of the user computing device 100 navigating to the user interface, the user computing device 100 may set a timer. If, after the predetermined period of time (e.g., after 5 seconds), the user computing device 100 has not received an input (e.g., from the user) selecting one of the plurality of user interface elements, the user computing device 100 may send a request to the server computing system 300 for a recommendation of one of the plurality of user interface elements to suggest for selection by the user. The server computing system 300 generates the recommendation of the first user interface element dynamically in response to receiving the request from the user computing device 100 and transmits the information indicating the first user interface element of the plurality of user interface elements is recommended for selection to the user computing device 100.

For example, in some implementations the user computing device 100 passively receives the information from the server computing system 300 indicating the first user interface element of the plurality of user interface elements is to be recommended for selection. For example, the server computing system 300 may provide the information indicating the first user interface element of the plurality of user interface elements is recommended for selection in response to the server computing system 300 determining from log activity between the user computing device 100 and the server computing system 300 that the user computing device 100 has not received an input (e.g., from the user) selecting one of the plurality of user interface elements during the predetermined period of time. The server computing system 300 generates the recommendation of the first user interface element dynamically in response to determining from the log activity that the user computing device 100 has not received an input (e.g., from the user) selecting one of the plurality of user interface elements during the predetermined period of time, and transmits the information indicating the first user interface element of the plurality of user interface elements is to be recommended for selection to the user computing device 100.

For example, the first user interface element of the plurality of user interface elements is recommended by the server computing system 300 based on one or more of a frequency of selection of the plurality of user interface elements by previous users, a recency of selection of the plurality of user interface elements by the previous users, context information associated with the selection of the plurality of user interface elements by previous users and context information of the user of the user computing device 100, and the like. For example, the server computing system 300 may recommend the first user interface element based on one or more additional considerations, such as user profile data and input history to the user interface before the user interface is provided. For example, the server computing system 300 may recommend the first user interface element based on a sequence of inputs received by the user computing device 100 prior to arriving at the user interface. The server computing system 300 may recommend a user interface element which is most frequently selected by other users who have provided one or more of the same sequence of inputs prior to arriving at the user interface.

For example, in some implementations if, after the predetermined period of time (e.g., after 5 seconds), the user computing device 100 has not received an input (e.g., from the user) selecting one of the plurality of user interface elements, the user computing device 100 itself determines the user interface element to recommend for selection based on one or more of a frequency of selection of the plurality of user interface elements by previous users, a recency of selection of the plurality of user interface elements by the previous users, context information associated with the selection of the plurality of user interface elements by previous users and context information of the user of the user computing device 100, and the like. For example, the user computing device 100 may recommend the first user interface element based on one or more additional considerations, such as user profile data and input history to the user interface before the user interface is provided. For example, the user computing device 100 may recommend the first user interface element based on a sequence of inputs received by the user computing device 100 prior to arriving at the user interface. The user computing device 100 may recommend a user interface element which is most frequently selected by other users who have provided one or more of the same sequence of inputs prior to arriving at the user interface. The user computing device 100 may receive or access information from one or more of the contextual information data store 370, the user interface history information data store 380, and the user profile data store 390, to determine the user interface element to recommend for selection.

In some implementations, the user computing device 100 may be provided with more than one user interface element that is recommended as a possible selection by the user. For example, a plurality of user interface elements may be recommended and the user computing device 100 may receive a selection of one of the plurality of user interface elements which are recommended. For example, in accordance with the example of FIG. 3, two or three of the most frequently selected user interface elements may be recommended for selection. For example, in accordance with the example of FIG. 3, two or three of the plurality of user interface elements may be recommended for selection based on an output obtained using the machine learning resource 3320*a*.

At operation 720, the user computing device 100 provides the recommendation to the user of the user computing device to select the first user interface element. For example, the user computing device 100 may provide the recommendation to the user using a recommendation user interface element to indicate to the user to select the first user interface element. For example, the user computing device 100 may provide the recommendation by other methods, such as by an audio output through a speaker via output device 170, by haptic feedback via output device 170, by changing a feature of the first user interface element (e.g., by highlighting the first user interface element, changing a color of the first user interface element, changing a size of the first user interface element, etc.), and the like. In some implementations, a combination of the above methods may be used by the user computing device 100 to provide the recommendation of the first user interface element for selection (e.g., by using a recommendation user interface element, changing one or more features of the first user interface element that is being suggested, and providing an audio output).

Referring to FIG. 8, the method 800 includes operation 810 of the server computing system 300 providing, for display on a display 160 of a user computing device 100, a user interface including a plurality of user interface elements. For example, the user interface may be generated by the user interface generator 330 and provided to the user computing device 100 via network 200. For example, the user interface may be a user interface that is associated with an application 130 that is being executed (at least partially) by the user computing device 100. For example, the user interface may be a user interface that is associated with a website or web page that is provided via the web browser 140 of the user computing device 100.

At operation 820 the method 800 includes the server computing system 300 determining the user computing device 100 has not received a selection of one of the plurality of user interface elements after a predetermined period of time. For example, the server computing system 300 may determine the user computing device 100 has not received a selection of one of the plurality of user interface elements after the predetermined period of time by receiving a request from the user computing device 100 for a recommendation of a user interface element of the plurality of user interface elements to suggest to a user of the user computing device 100. For example, the server computing system 300 may determine the user computing device 100 has not received a selection of one of the plurality of user interface elements after the predetermined period of time by tracking or analyzing log activity between the user computing device 100 and the server computing system 300. The log activity may indicate that a user of the user computing device 100 has not received an input selecting one of the plurality of user interface elements for the predetermined period of time.

At operation 830 the method 800 includes, in response to determining the user computing device has not received the selection of the one of the plurality of user interface elements after the predetermined period of time, the server computing system 300 determining a first user interface element of the plurality of user interface elements to recommend for selection by the user of the user computing device 100, based on one or more previous interactions with one or more of the plurality of user interface elements by one or more users of respective user computing devices. Here, the one or more users of the respective user computing devices may include the user of the user computing device 100. In another implementation, the one or more users of the respective user computing devices may include the user of the user computing device 100 as well as other users of other user computing devices. In still another implementation, the one or more users of the respective user computing devices may include only one or more users of user computing devices other than the user of the user computing device 100. For example, the server computing system 300 may recommend the first user interface element of the plurality of user interface elements based on one or more of a frequency of selection of the plurality of user interface elements, a recency of selection of the plurality of user interface elements, a context of selection of the plurality of user interface elements, and the like. For example, the server computing system 300 may recommend the first user interface element based on one or more additional considerations, such as user data and input history to the user interface. For example, the server computing system 300 may recommend the first user interface element based on a sequence of inputs received by the user computing device 100 prior to arriving at the user interface. The server computing system 300 may recommend a user interface element which is most frequently selected by other users who have provided one or more of the same sequence of inputs prior to arriving at the user interface. The server computing system 300 dynamically generates the recommendation of the first user interface element after determining the user computing device 100 has not received a selection of one of the plurality of user interface elements.

At operation 840 the method 800 includes providing information to the user computing device 100 indicating a recommendation to the user of the user computing device 100 to select the first user interface element of the plurality of user interface elements. For example, the information may include instructions to provide an output (e.g., an audio output) which suggests the first user interface element for selection by the user. In some implementations, the information may include the user interface generated by the server computing system 300 for display on the display 160 of the user computing device 100, where the user interface includes a recommendation user interface element which suggests the first user interface element for selection by the user. The information may include location information as to where the recommendation user interface element should be placed on the user interface. In some implementations, the recommendation user interface element may include text information that includes a text summary related to the suggested first user interface element and/or an image related to the suggested first user interface element. In some implementations, the information may include the user interface generated by the server computing system 300 for display on the display 160 of the user computing device 100, where one or more features of the first user interface element which the server computing system 300 has determined is to be suggested for selection by the user has been modified (e.g., by highlighting the first user interface element, changing a color of the first user interface element, changing a size of the first user interface element, etc.).

Terms such as "module", "unit," "provider," "recommender," and "generator" may be used herein in association with various features of the disclosure. Such terms may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Aspects of the above-described example embodiments may be recorded in computer-readable media (e.g., non-transitory computer-readable media) including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

While the disclosure has been described with respect to various example embodiments, each example is provided by way of explanation, not limitation of the disclosure. Those skilled in the art, upon attaining an understanding of the foregoing, can readily produce alterations to, variations of, and equivalents to such embodiments. Accordingly, the disclosure does not preclude inclusion of such modifications, variations and/or additions to the disclosed subject matter as would be readily apparent to one of ordinary skill in the art. For example, features illustrated or described as part of one embodiment can be used with another embodiment to yield a still further embodiment. Thus, it is intended that the disclosure covers such alterations, variations, and equivalents.

What is claimed is:

1. A user computing device, comprising:
a display;
one or more memories configured to store instructions; and
one or more processors configured to execute the instructions stored in the one or memories to perform operations, the operations including:
providing the display with a user interface including a plurality of user interface elements, and
in response to the user computing device not receiving a selection of one of the plurality of user interface elements after a predetermined period of time, providing a recommendation to a user of the user computing device indicating a first user interface element of the plurality of user interface elements is recommended for selection, wherein the recommendation is generated after the predetermined period of time and is based on one or more previous interactions with one or more of the plurality of user interface elements by one or more users of respective user computing devices.

2. The user computing device of claim 1, wherein the one or more processors are configured to provide the recommendation to the user of the user computing device by providing the user interface with a recommendation user interface element which provides the recommendation to the user of the user computing device to select the first user interface element of the plurality of user interface elements.

3. The user computing device of claim 2, wherein the recommendation user interface element is disposed adjacent to the first user interface element and includes at least one of a text summary or an image indicating to select the first user interface element.

4. The user computing device of claim 1, further comprising an output device,
wherein the recommendation is provided to the user via at least one of audio output or haptic feedback.

5. The user computing device of claim 1, wherein the one or more processors are configured to provide the recommendation to the user of the user computing device by changing one or more features of the first user interface element.

6. The user computing device of claim 5, wherein the one or more processors are configured to change the one or more features of the first user interface element by at least one of highlighting the first user interface element, changing a size of the first user interface element, or changing a color of the first user interface element.

7. The user computing device of claim 1, wherein the operations include:
in response to the user computing device not receiving the selection of one of the user interface elements after the predetermined period of time, transmitting, to a server computing system, a request for a recommendation of a user interface element of the plurality of user interface elements for selection, and
receiving, from the server computing system, information indicating the first user interface element of the plurality of user interface elements is recommended for selection.

8. The user computing device of claim 7, wherein the information indicating the first user interface element of the plurality of user interface elements is recommended for selection includes:
the user interface further including a recommendation user interface element generated by the server computing system, or
information for the one or more processors to generate the user interface including the recommendation user interface element,
wherein the recommendation user interface element provides the recommendation to the user of the user computing device indicating the first user interface element of the plurality of user interface elements is recommended for selection.

9. A server computing system, comprising:
one or more memories configured to store instructions; and
one or more processors configured to execute the instructions stored in the one or memories to perform operations, the operations including:
providing, for display on a display of a user computing device, a user interface including a plurality of user interface elements,
in response to an indication that the user computing device has not received a selection of one of the plurality of user interface elements after a predetermined period of time, determining a first user interface element of the plurality of user interface elements to recommend for selection by a user of the user computing device, based on one or more previous interactions with one or more of the plurality of user interface elements by one or more users of respective user computing devices, and
providing information to the user computing device indicating a recommendation to the user of the user computing device to select the first user interface element of the plurality of user interface elements.

10. The server computing system of claim 9, wherein the information indicating the recommendation to the user of the user computing device includes a recommendation user interface element for display on the user interface which provides the recommendation to the user of the user computing device to select the first user interface element of the plurality of user interface elements.

11. The server computing system of claim 9, wherein the information indicating the recommendation to the user of the user computing device includes information for the user computing device to produce an audio output providing the recommendation to the user of the user computing device to select the first user interface element of the plurality of user interface elements.

12. The server computing system of claim 9, wherein the information indicating the recommendation to the user of the user computing device includes information to change one or more features of the first user interface element to provide the recommendation to the user of the user computing device to select the first user interface element of the plurality of user interface elements.

13. The server computing system of claim 12, wherein the information to change one or more features of the first user interface element includes at least one of:
information to highlight the first user interface element, information to change a size of the first user interface element, or information to change a color of the first user interface element.

14. The server computing system of claim 9, wherein the indication that the user computing device has not received the selection of one of the plurality of user interface elements after the predetermined period of time includes the one or more processors receiving a request for a recommendation of a user interface element of the plurality of user interface elements for selection by the user of the user computing device, and the one or more processors are configured to, in response to receiving the request, determine the first user interface element of the plurality of user interface elements to recommend for selection by the user of the user computing device.

15. The server computing system of claim 9, wherein the indication that the user computing device has not received the selection of one of the plurality of user interface elements after the predetermined period of time includes log activity of the user computing device indicating the user computing device has not received the selection of one of the plurality of user interface elements for the predetermined period of time.

16. The server computing system of claim 9, wherein the one or more processors are configured to determine a user interface element among the plurality of user interface elements which is most frequently selected by the one or more users other than the user of the user computing device, as the first user interface element.

17. The server computing system of claim 9, wherein the one or more processors are configured to determine the first user interface element based on a sequence of one or more inputs to the user computing device before the user interface including the plurality of user interface elements is provided for display on the display of the user computing device.

18. The server computing system of claim 17, wherein the one or more processors are configured to determine the first user interface element based on a user interface element among the plurality of user interface elements which is most frequently selected by one or more users other than the user of the user computing device after a same sequence of the one or more inputs to respective user computing devices of the one or more users other than the user of the user computing device, before the user interface including the plurality of user interface elements is provided for display on respective displays of the respective user computing devices.

19. The server computing system of claim 9, wherein the one or more processors are configured to determine the first user interface element based on contextual information including at least one of a time of day, weather information at a location associated with the user computing device, traffic information associated with the user computing device, user profile information of the user of the user computing device, or user profile information of one or more users other than the user of the user computing device.

20. A computer implemented method for a server computing system, the method comprising:

providing, for display on a display of a user computing device, a user interface including a plurality of user interface elements;

determining the user computing device has not received a selection of one of the plurality of user interface elements after a predetermined period of time;

in response to determining the user computing device has not received the selection of the one of the plurality of user interface elements after the predetermined period of time, determining a first user interface element of the plurality of user interface elements to recommend for selection by a user of the user computing device, based on one or more previous interactions with one or more of the plurality of user interface elements by one or more users of respective user computing devices; and providing information to the user computing device indicating a recommendation to the user of the user computing device to select the first user interface element.

\* \* \* \* \*